(12) United States Patent
Wild

(10) Patent No.: US 10,914,811 B1
(45) Date of Patent: Feb. 9, 2021

(54) LOCATING A SOURCE OF A SOUND USING MICROPHONES AND RADIO FREQUENCY COMMUNICATION

(71) Applicant: Amazon Technologies, Inc., Seattle, WA (US)

(72) Inventor: Benjamin Wild, Marina Del Rey, CA (US)

(73) Assignee: Amazon Technologies, Inc., Seattle, WA (US)

(*) Notice: Subject to any disclaimer, the term of this patent is extended or adjusted under 35 U.S.C. 154(b) by 138 days.

(21) Appl. No.: 16/137,166

(22) Filed: Sep. 20, 2018

(51) Int. Cl.
| | | |
|---|---|---|
| G01S 3/808 | (2006.01) | |
| G08B 3/10 | (2006.01) | |
| H04M 11/02 | (2006.01) | |
| H04R 29/00 | (2006.01) | |

(52) U.S. Cl.
CPC .......... *G01S 3/8083* (2013.01); *G08B 3/1016* (2013.01); *H04M 11/025* (2013.01); *H04R 29/004* (2013.01); *H04S 2400/11* (2013.01)

(58) Field of Classification Search
CPC .... H04R 29/00; H04R 29/001; H04R 29/004; G01S 3/8083; G01S 3/8086; G08B 3/10; G08B 3/1008; G08B 3/1016; H04M 11/025
USPC ................... 381/56, 58, 77, 79, 82, 92, 122; 340/384.1, 539.1, 539.13
See application file for complete search history.

(56) References Cited

U.S. PATENT DOCUMENTS

| | | | | |
|---|---|---|---|---|
| 6,308,114 | B1 * | 10/2001 | Kim ......................... | G01S 5/22 340/679 |
| 7,629,880 | B2 * | 12/2009 | Stilp ........................ | G08B 1/08 340/506 |
| 9,870,719 | B1 * | 1/2018 | Watkins ................ | H04W 76/10 |
| 10,039,073 | B2 * | 7/2018 | Kakani .................... | G01S 11/02 |
| 10,236,018 | B2 * | 3/2019 | Moore ................... | H04R 3/005 |
| 10,511,707 | B2 * | 12/2019 | Johnson ............ | H04M 1/72555 |
| 2007/0146127 | A1 * | 6/2007 | Stilp ........................ | G08B 1/08 340/531 |
| 2013/0273935 | A1 * | 10/2013 | Amizur ................. | H04W 24/00 455/456.1 |
| 2015/0312662 | A1 * | 10/2015 | Kishimoto ............. | H04R 3/005 381/92 |
| 2016/0163168 | A1 * | 6/2016 | Brav ................... | G08B 13/1672 381/56 |
| 2017/0019744 | A1 * | 1/2017 | Matsumoto .......... | H04R 29/008 |

* cited by examiner

*Primary Examiner* — Xu Mei
(74) *Attorney, Agent, or Firm* — Greenberg Traurig, LLP

(57) ABSTRACT

A source of a sound is located by two or more computing devices (e.g., A/V recording and communication devices) using microphones and radio frequency communication among the computing devices. The location of the source is determined based on at least a time difference between a time that a notification from a first computing device regarding the sound arrives at a second computing device, and a time of detecting the sound at the second computing device. Additional data may be collected and/or other actions may be taken in response to locating the source of the sound.

27 Claims, 15 Drawing Sheets

LOCATING A SOURCE OF A SOUND USING MICROPHONES AND RADIO FREQUENCY COMMUNICATION

TECHNICAL FIELD

The present embodiments relate to security systems that include sensors, automation devices, and/or audio/video (NV) recording and communication devices. In particular, the present embodiments relate to improvements in the functionality of security systems that strengthen the ability of such systems to reduce crime and enhance public safety.

BACKGROUND

Home safety is a concern for many homeowners and renters. Those seeking to protect or monitor their homes often wish to be informed of breaches to the security of their homes and also have video and audio communications with visitors/trespassers, for example, those visiting/trespassing near an external door or entryway. Security systems that include sensors, automation devices, and/or A/V recording and communication devices, such as doorbells, provide this functionality, and can also aid in crime detection and prevention. For example, sensor information, audio, and/or video captured by a security system, such as by an A/V recording and communication doorbell of a security system, can be uploaded to the cloud and recorded on a remote server. Subsequent review of the sensor information and/or the A/V footage can aid law enforcement in capturing perpetrators of home burglaries and other crimes. Further, the presence of a security system including one or more an A/V recording and communication devices on the exterior of a home, such as a doorbell unit at the entrance of a home, acts as a powerful deterrent against would-be burglars.

BRIEF DESCRIPTION OF THE DRAWINGS

The various embodiments of the present locating a source of a sound using microphones and radio frequency communication now will be discussed in detail with an emphasis on highlighting the advantageous features. These embodiments depict the novel and non-obvious locating a source of a sound using microphones and radio frequency communication shown in the accompanying drawings, which are for illustrative purposes only. These drawings include the following figures, in which like numerals indicate like parts.

DETAILED DESCRIPTION

Figure 1:
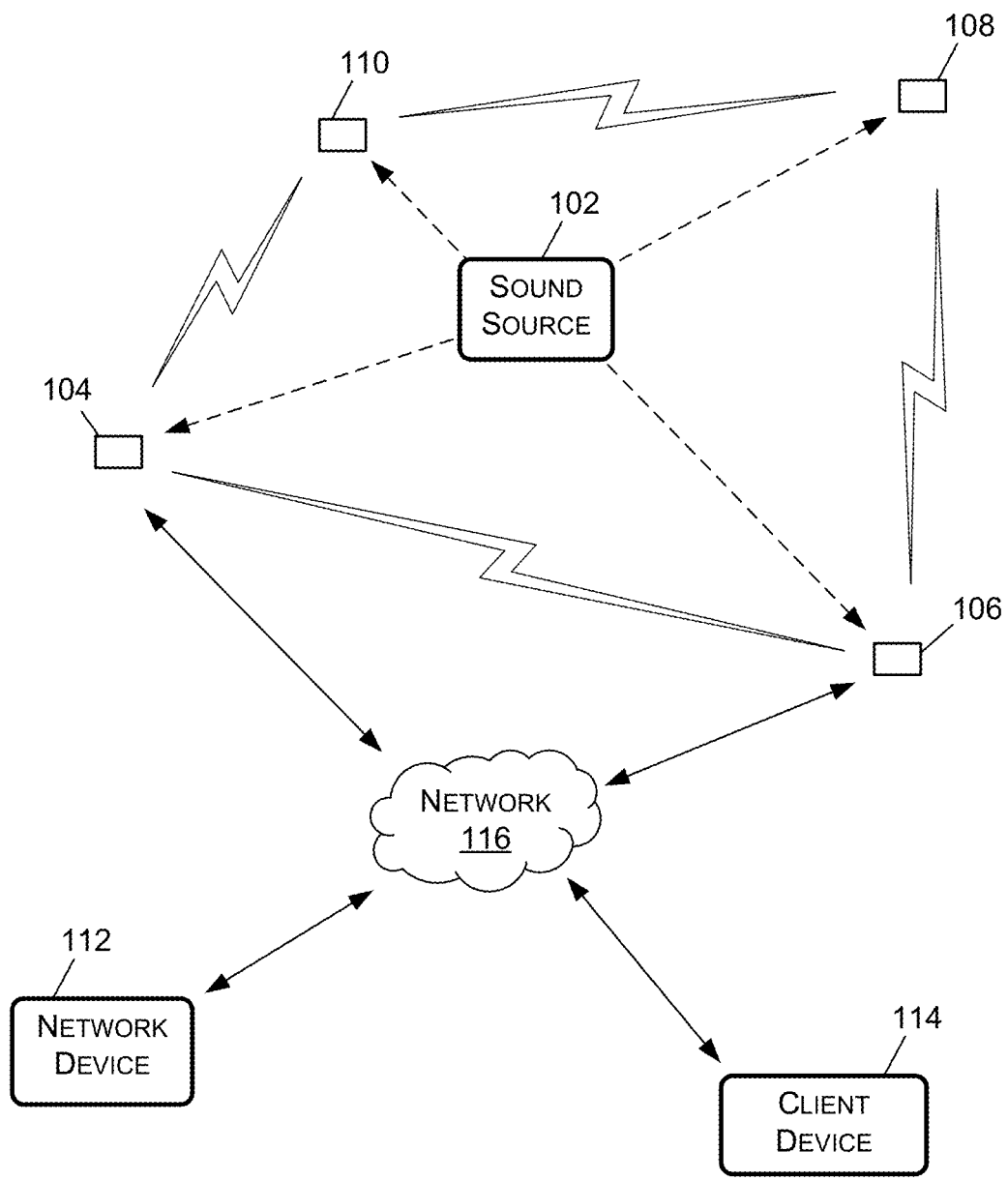
FIG. 1 is a schematic diagram illustrating an example of locating a source of a sound using microphones and radio frequency communication, according to various aspects of the present disclosure.

The various embodiments of the present locating a source of a sound using microphones and radio frequency communication have several features, no single one of which is solely responsible for their desirable attributes. Without limiting the scope of the present embodiments as expressed by the claims that follow, their more prominent features now will be discussed briefly. After considering this discussion, one will understand how the features of the present embodiments provide the advantages described herein.

One aspect of the present embodiments includes the realization that the occurrence of certain events that cause a sound (e.g., a gunshot, an activated smoke alarm, or a person yelling) in the proximity of a home or business location indicates a potentially dangerous or otherwise threatening situation. The failure to determine a location of the source of the sound (e.g., the location where the gun was shot, the location of the smoke alarm that was activated, or the location where the person yelled) may prevent taking protective or other measures that are appropriate for this type of situation.

Another aspect of the present embodiments includes the realization that when coordinating processing and/or communication by two or more computing devices used to locate a source of a sound, it is difficult to time-synchronize the devices that are used to detect the sound and/or to locate the source of the sound. For example, without sufficient time synchronization, timing differences between computing devices can introduce errors when calculating or otherwise determining a location of the sound source.

Various embodiments solve the above problems by leveraging the functionality of computing devices to determine the location of a source of a sound based on detecting the sound by each of two or more computing devices, and based on radio frequency signals transmitted, and received, by the computing devices. For example, the sound may be detected by one or more of the computing devices based on analysis of audio data collected by a microphone of one or more of the computing devices. The location of the source of the sound is determined based on at least a time difference between a time that a notification regarding the sound from a first computing device arrives at a second computing device and a time of detecting the sound at the second computing device. In one example, one or more of the computing devices may be an A/V recording and communication device (e.g., an A/V recording and communication doorbell), a virtual assistant (VA) device, a home security hub, and/or a sensor, etc.

One concern regarding home security for many homeowners and renters is suspicious activity that occurs on or near (e.g., in the neighborhood) a building or other property of the homeowner or renter. Often, such suspicious activity creates at least some sound (e.g., the firing of a gun). In other cases, a sound is caused by an event that indicates a dangerous condition or situation (e.g., an imminent fire danger to a building or other property), such as when a smoke alarm is activated and emits a siren sound, a person falls (e.g., an elderly person trips in her home), or an object in a home falls (e.g., due to an earthquake).

In various embodiments described below, the location of a source of such a sound is determined using data from one or more computing devices (e.g., A/V recording and communication devices, virtual assistant devices, home security hubs and/or sensors, etc.) that detect a sound caused by the event. For example, the sound source is located based on audio data collected by microphones of two or more computing devices and data relating to radio frequency communication between the two or more computing devices. The location of the sound source is determined based on a time difference between a time that a notification from a first one of the computing devices regarding the sound arrives at a second one of the computing devices and a time of detecting the sound at the second one of the computing devices. Additional data may be collected and/or other actions may be taken in response to locating the source of the sound.

The computing devices used to locate the sound may be located on the property of the homeowner or renter, and/or one or more of these devices may be located geographically proximate the property (e.g., one or more computing devices located in a neighborhood of the property). The location of a source of the sound may be based on, for example, processing of audio data and processing of other data received in notifications from one or more of these devices. In one example, the audio data may include, for example, data collected by a microphone regarding the sound itself, and/or data associated with collection of the sound such as the time of collection and/or characteristics of the microphone when the sound is collected. In one example, the time of collection is a time stamp determined by a processor of the computing device that includes the microphone. The time stamp can be included in a communication (e.g., an RF signal) sent to another computing device. In one example, the characteristics of the microphone include a microphone gain, sensitivity, and/or polar pattern. In one example, the transmitted notification is a radio frequency signal that indicates that a sound detection event occurred and/or includes characteristics of the type of sound detected, and/or data regarding one or more other sounds detected within a predetermined time period of the time of detecting the sound that caused the sending of the notification.

In some cases, the signal does not include any time information. Instead, the signal merely indicates that a sound was detected. In one example, time information can be associated with the signal by the computing device that receives the signal. For example, a computing device that receives the signal can use an operating basis that the time of arrival of the signal at the receiving computing device substantially coincides (e.g., within a predetermined time window or period) with the time that the transmitting computing device detected the sound (e.g., with some predetermined time period of delay built in that corresponds to a processing time required for the transmitting computing device to process a sound received by its microphone and then transmit the signal).

As a result of locating a source of a sound, one or more communications can be transmitted to a computing device (e.g., a client device) associated with the homeowner or renter, a communication hub (e.g., a premises security hub), a monitoring server, a centralized security system (e.g., a security system that is networked to receive audio, image, and/or other data from multiple computing devices, where each device is associated with a different homeowner), and/or another computing device. In addition, or alternatively, one or more other actions can be performed as a result of locating the source of the sound. These actions may include, for example, causing computing or other functions to occur on devices other than the computing device(s) from which audio data was collected and used to detect the sound. These functions may include, for example, activation of a camera on one or more A/V recording and communication devices to collect video data, and/or causing initiation of audio and/or video data streaming from one or more devices. These functions may also include, for example, one or more functions performed by the communication hub, the monitoring server, and/or the centralized security system (e.g., additional signal processing of collected audio data and/or video data).

In various embodiments, a source of a sound is located using two or more devices where each device includes a microphone and a radio. When a first device hears a sound from the source, the first device sends a notification using a radio link to at least one of the other devices. The radio link uses, for example, a direct over-the-air link between the first device and the at least one other device(s). Alternatively, the radio link may use, for example, Wi-Fi, Bluetooth, cellular phone, or another form of wireless communication. For example, Wi-Fi can be used in a direct peer-to-peer mode. Using Wi-Fi in a peer-to-peer mode provides faster communication than Wi-Fi modes that require routing through one or more other devices (e.g., routing through a network router). For example, routing a notification through a router would introduce additional delay in sending the notification to one of the other devices. This additional delay typically would add additional positional uncertainty to the sound source location determination. In an alternative embodiment, laser-based (or other light-based) communication can be used for communication between devices instead of, or in addition to, one or more radio links.

The notification indicates to the one or more other devices that a sound was detected. The notification may include various data associated with detection of the sound. For example, the notification can include a time stamp that identifies the time of detection of the sound by the first device, and/or other data associated with the sound. In another example, the notification includes time(s) of detection (e.g., based on time stamps) by one or more other devices that detected the sound earlier than the device that transmits the notification. In yet another example, the notification includes a location for each device that has detected the sound along with a corresponding time stamp or other data indicating a time of detection of the sound by the respective device.

The speed of radio waves (e.g., as sent by a radio of an A/V recording and communication device or another computing device in response to detecting a sound) is significantly faster than the speed of sound. In an embodiment, a difference in the time of flight of sound waves (associated with a sound from a source) arriving at each microphone of the distributed computing devices is measured and used, in combination with a time of arrival of the radio frequency signal sent from the first computing device and received by at least one of the other computing devices, to determine a location of the source of the sound. For example, a time difference may be calculated between (1) the time of arrival of the radio frequency signal sent from the first computing device and received at one of the computing devices, and (2) the time of arrival of the sound at that computing device. Since the speed of the radio frequency signal sent from the first computing device is known (or can at least be estimated as described below), and since the speed of the sound from the sound source is known (or can at least be estimated as described below), the location of the sound source can be determined using known techniques, such as triangulation, trilateration, etc.

For example, when using two computing devices, the location of the sound source can be determined as a plane in three-dimensional space. When using three computing devices, the location of the sound source can be determined as a line in space. When using four computing devices, a precise location of the sound source can be determined. In various embodiments, the speed of the radio frequency signal sent from the first computing device may be assumed to be equal to the speed of light in vacuum, which is equal to 299,792,458 meters per second, and the speed of the sound from the sound source may be assumed to be equal to the speed of sound in dry air at 0° C. (32° F.), which is equal to 331.2 meters per second. In alternative embodiments, the speed of the radio frequency signal sent from the first computing device and/or the speed of the sound from the sound source may be adjusted to compensate for known environmental conditions in the vicinity of the sound source.

The source of a sound that is located may include both indoor and outdoor sources. For example, a source of the sound can be an activated smoke alarm located in a room of a house, an activated smoke alarm located in one of several different buildings each having its own smoke alarm, a gun that was fired indoors or outdoors, a vehicle that is driving on a road or that pulled into a driveway of a house, and/or a person yelling outside or in a room of a house.

In an alternative embodiment, each of the computing devices used to detect a sound has an Internet or other network connection. Instead of using radios to exchange data or send notifications, data is exchanged between the computing devices using the network connection. In one example, communication using a network time protocol can achieve timing accuracy of 50 ms or less, which translates to about 45 feet of error in source-locating precision. In contrast, timing accuracy when using a radio link between computing devices can be 1 ms or less, even at long ranges (e.g., a range greater than 1,000 feet, or a range greater than 5,000 feet), which substantially reduces the error in source-locating precision.

In various embodiments, the computing devices used to detect a sound (e.g., using a microphone) may also be connected by a network and/or radio to a computing device (e.g., a backend server) used to perform calculations to determine the location of the source of the sound. For example, the backend server can receive notifications from one or more of the computing devices that detect the sound. Each notification can include, for example, data associated with detection of the sound (e.g., time of detection, an identification of the specific device(s) and corresponding times of detection of the sound, and/or data characterizing the nature of the sound that has been detected by a respective device).

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic diagram illustrating an example of locating a source 102 of a sound based on audio data collected by microphones of two or more computing devices 104, 106, 108, and 110, and based on a radio frequency (RF) signal sent from at least a first one of the computing devices and received by at least one other of the computing devices, according to various aspects of the present disclosure. For example, at least one of the computing devices 104-110 can be an A/V recording and communication device that includes a microphone to detect the sound and a radio (e.g., an RF transceiver or an RF transmitter and an RF receiver, etc.). One or more of the computing devices 104-110 may not be an A/V recording and communication device, and may instead comprise a smart-home device (e.g., a hub device, a sensor device, an automation device, a virtual assistant (VA) device, etc. (may be referred to as "electronic device" or "computing device").

In general, sound caused by a sound source 102 travels to and reaches each of the computing devices at a different time (e.g., sound travel is indicated by dashed arrows in FIG. 1). The time of arrival of the sound at a respective device may be determined and recorded. For example, the time of arrival can correspond to detection of the sound by a microphone of the respective device. For example, the time of arrival can be recorded by associating a time stamp to the detection of the sound by the microphone.

Each of the computing devices 104-110 can communicate with one or more of the other devices. For example, each device may include a radio that is used to wirelessly communicate with another device. In another example, each device may additionally or alternatively communicate with other of the devices using a wired network connection.

In an embodiment, in response to detecting the sound, at least one of the computing devices 104-110 (e.g., a "first device") sends a notification to one or more of the other devices. In addition, the notification can further be sent, over a network 116, to a network device 112 and/or a client device 114. The network 116 can include, for example, wireless and/or wired communication.

In an embodiment, the network device 112 receives notifications from two or more of the computing devices 104-110. Data retrieved by the network device 112 from these notifications is used to determine a location of the sound source 102. For example, the network device 112 determines a location of the sound source 102 based on at least a time difference between the time of arrival of an RF notification signal from a first one of the computing devices 110 and received at a second one of the computing devices 106, and the time of arrival of the sound at the same (second) computing device 106. In one example, the time difference is determined by the second computing device 106 itself, and the time difference is included in a notification sent from the second computing device 106 to the network device 112. In one example, the RF notification signal received at the second computing device 106 is transmitted from the first computing device 110 when the first computing device 110 detects the sound.

In an embodiment, others of the computing devices 104-110 may each determine a time difference based on a time of arrival of a notification sent by another device that has detected a sound, and a time of arrival of the sound as detected by the computing device 104-110. Each time difference is sent to the network device 112 along with data that identifies the sending device. In one example, the notification is sent by the first computing device 110 to each of the computing devices 104, 106, and 108. The time difference at each of the computing devices 104, 106, and 108 is determined based on the respective time of arrival of the notification when received from the first computing device 110.

In an embodiment, the network device 112 determines a location of the sound source 102 with a precision that varies depending on the extent of data regarding the sound received by the network device 112. For example, the location precision typically increases as data regarding detection of the sound is received from a greater number of computing devices 104-110.

In an embodiment, the geographic location of each of the computing devices 104-110 is known prior to determining the location of the sound source 102. These locations are stored, for example, in memory or a database accessible by the network device 112.

In an embodiment, the location of each computing device 104-110 is determined using the client device 114. For example, using location services (e.g., global navigation satellite system (GNSS), such as global positioning systems (GPS)) of the client device 114, the client device 114 is held proximate to a computing device 104-110, and a button in a user interface of the client device 114 is pressed or otherwise activated so that a known location of the client device 114 can be associated with and stored as the location of the respective computing device 104-110.

In various embodiments, the time and location data received by the network device 112 may be used to calculate a location of the sound source 102 using conventional location equations. For example, equations used to calculate locations for GPS systems can similarly be used to calculate a location for the sound source 102. In one example, the network device 112 can receive messages from the computing devices 104-110 with time and other data as described herein. In one example, the x, y, and z components of each computing device position are known, and the clocks or timing mechanism used by each computing device 104-110 are assumed to be synchronized. In another example, the x, y, and z components of each computing device 104-110 position are known, and the location of the sound source 102 is determined using the data received from the two or more of the computing devices 104-110, where the data includes a time difference between (1) when the signal from the first computing device 110 was received by at least one other of the computing devices 104-108 (where that signal was transmitted from the first computing device 110 when the first computing device 110 received the sound), and (2) when the sound was received at the at least one other of the computing devices 104-108.

In an embodiment, after the location of the sound source 102 is determined by the network device 112, the network device 112 sends a communication over the network 116 to the client device 114. The communication includes, for example, an indication that a sound has been detected, a characterization of the sound, other data associated with the sound (e.g., image data of the sound source 102 as captured by a computing device that is in close proximity to the sound source 102), and/or the location of the sound source 102.

In an embodiment, after determining the location of the sound source 102, at least one camera device is identified. The identified camera device(s) is, for example, activated by a communication from the network device 112 and/or the client device 114, or the identified camera device(s) is activated due to motion detected by that device, or the identified camera device(s) is always recording, etc. After being activated, the identified camera device(s) records and transmits audio and/or image data to a computing device, such as the network device 112. For example, the audio and/or image data can be transmitted to a backend device (not shown) in communication with the network device 112. In one example, the identified camera device(s) includes one or more of the computing devices 104-110.

In an embodiment, the network device 112 stores a signature corresponding to a prior sound generated by the sound source 102 (e.g., the prior sound is a sound intentionally caused to occur by a user, such as a sound from a smoke alarm or other object/device in the home of the user that is caused to occur when first setting up a home security system). The determination of the location of the sound source 102 is further based on the signature. In one example, the network device 112 stores a signature that is generated by causing the source to create the sound. For example, an input can be provided by a user in a user interface of the client device 114. This input causes the sound source 102 to generate the prior sound. The prior sound is detected by one or more microphones (e.g., microphones of the computing devices 104-110). Audio data is collected from the one or more microphones and used to create the signature that is stored.

In an embodiment, the client device 114 is associated with one or more of the computing devices 104-110. In some cases, for example, the sound source 102 is a known device that generates sound (e.g., a smoke alarm). In such cases, the client device 114 may be used to transmit location data when physically proximate to the sound source 102. The network device 112 receives the location data from the client device 114, and determines the location of the sound source 102 further based on the location data. In one example, the client device 114 transmits the location data in response to a user input on the client device 114 (e.g., by touching or clicking in a user interface, or pressing a physical button) when the client device 114 is proximate the sound source 102 (e.g., using location services of the client device 114, such as GNSS (e.g., GPS)).

In an embodiment, the network device 112 further receives a location corresponding to a point in the interior of a structure, on the exterior of a structure, and/or at a geographic location outside of a structure, and stores the location(s) in at least one database. In one example, the location of the sound source 102 determined by the network device 112 is one of the stored locations.

In an embodiment, one or more of the computing devices 104-110 is an A/V recording and communication device including a microphone and a radio. Each A/V recording and communication device detects the sound after the microphone has transitioned from a passive state to an active state in response to a determination that an amplitude of a prior sound detected by the microphone exceeds a predetermined threshold. For example, the A/V recording and communication device is activated by a first sound that exceeds the threshold, and then the A/V recording and communication device detects a later sound generated from the sound source 102. The detection of the later sound by one or more devices is used to locate the sound source 102. For example, the first sound may be detected five or more seconds prior to the later sound.

In an embodiment, the sound detected by one of the computing devices 104-110 is classified by comparison to stored data regarding known types of sounds. The classification is sent with time and/or other data in a transmitted notification. In one example, the classification is done by the computing device and/or the network device 112. The classification can be used, for example, when determining the location of the sound source 102.

The determination of the location of the sound source 102 has been described above as being performed by the network device 112. In other embodiments, one or more of the computing devices 104-110 and/or the client device 114 can determine the location. For example, each such device can determine a respective location of the sound source 102. The respective location that is determined may be different for each device (e.g., may vary within a difference range of 100 to 1,000 feet) as each device is calculating a location using differing quantities and/or types of data.

Figure 2:
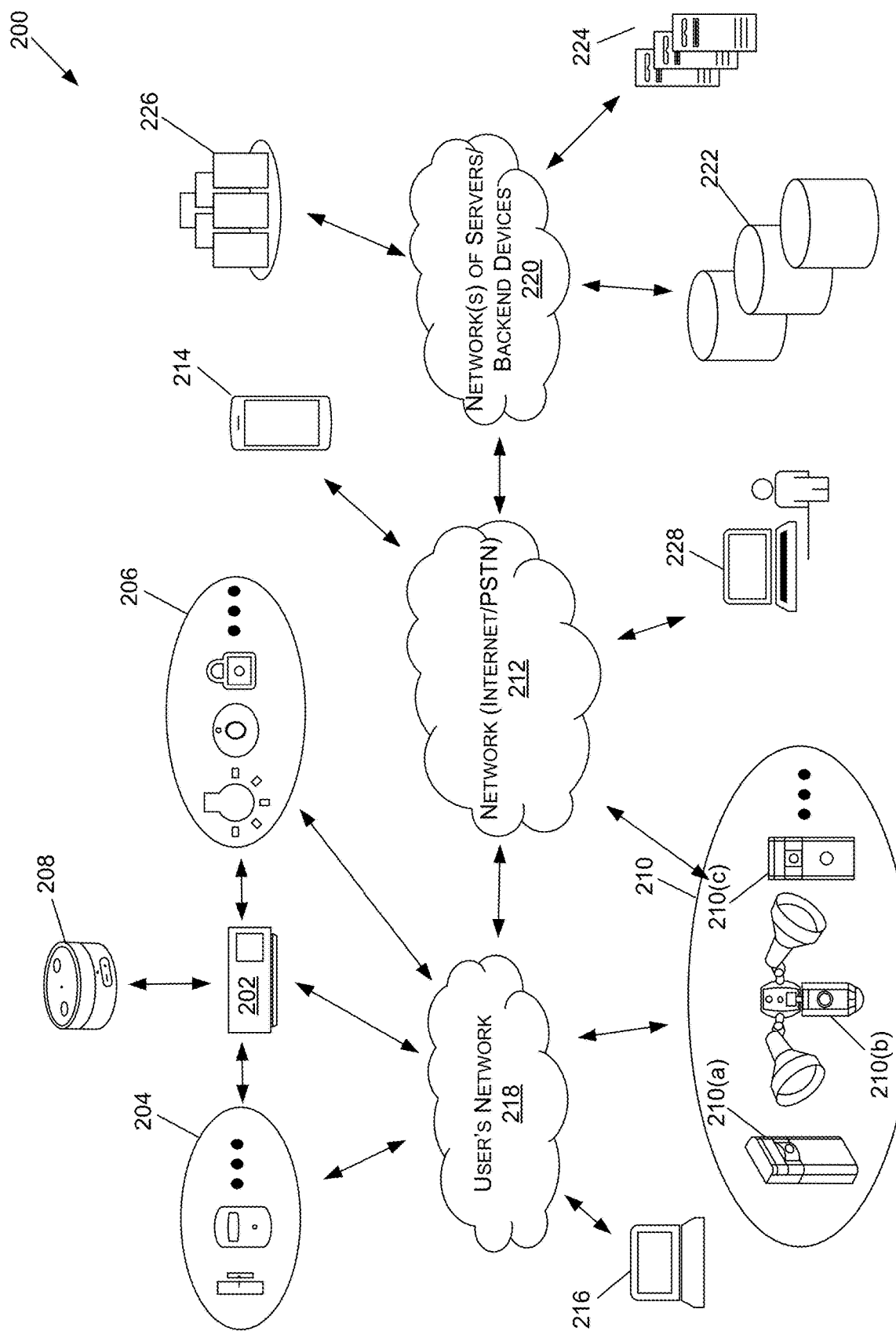
FIG. 2 is a schematic diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network-connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (NV) recording and communication devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, a communication hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively referred to herein as "A/V devices 210" or "A/V device 210") (which may represent, and/or be similar to, one or more of the computing devices 104-110 of FIG. 1). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a hub device 202 connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

In an embodiment, the hub device 202 may determine the location of source 102. In one example, the hub device 202 determines the location in addition to determination of a location of the sound source 102 by the network device 112. The precision of the location determined by each device may be different.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/ or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at a location, such as a property, building, home, business, or premises for the purpose of securing and/or automating all or a portion of the location.

The system 200 may further include one or more client devices 214, 216 (which may represent, and/or be similar to, the client device 114 of FIG. 1). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (which may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220.

Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices." The network device 112 of FIG. 1 may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control its own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
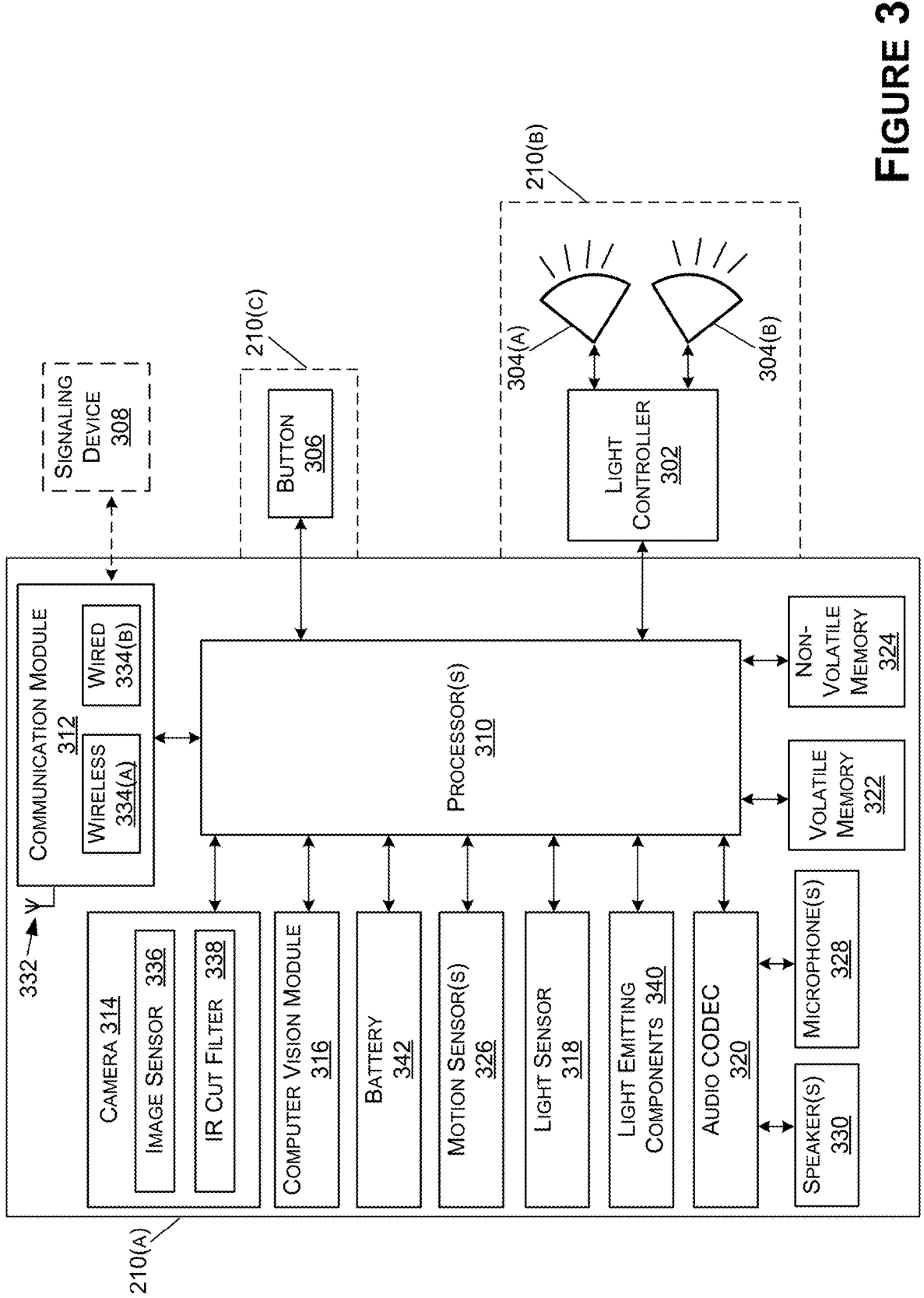
FIG. 3 is a functional block diagram of an A/V recording and communication device according to various aspects of the present disclosure.

FIG. 3 is a functional block diagram for an audio/video (NV) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include one or more processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, including the client device 214, 216, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal may be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the image sensor 336 may comprise a complementary metal-oxide semiconductor (CMOS) array and may be capable of recording high definition (e.g., 720p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SDRAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not to be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively separate from, other motion sensor(s) 326. For example, the CVM 316 may be a low-power CVM (e.g., Qualcomm Glance®) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternatively separate from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to ensure that it satisfies certain assumptions implied by the method. Examples of pre-processing include, but are not limited to re-sampling in order to ensure that the image coordinate system is correct, noise reduction in order to ensure that sensor noise does not introduce false information, contrast enhancement to ensure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and to enable face detection and recognition.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motion sensor(s) 326 and/or the camera 314 detecting motion, the light controller 302 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to begin recording the image data, and the microphone(s) 328 to begin recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more components of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
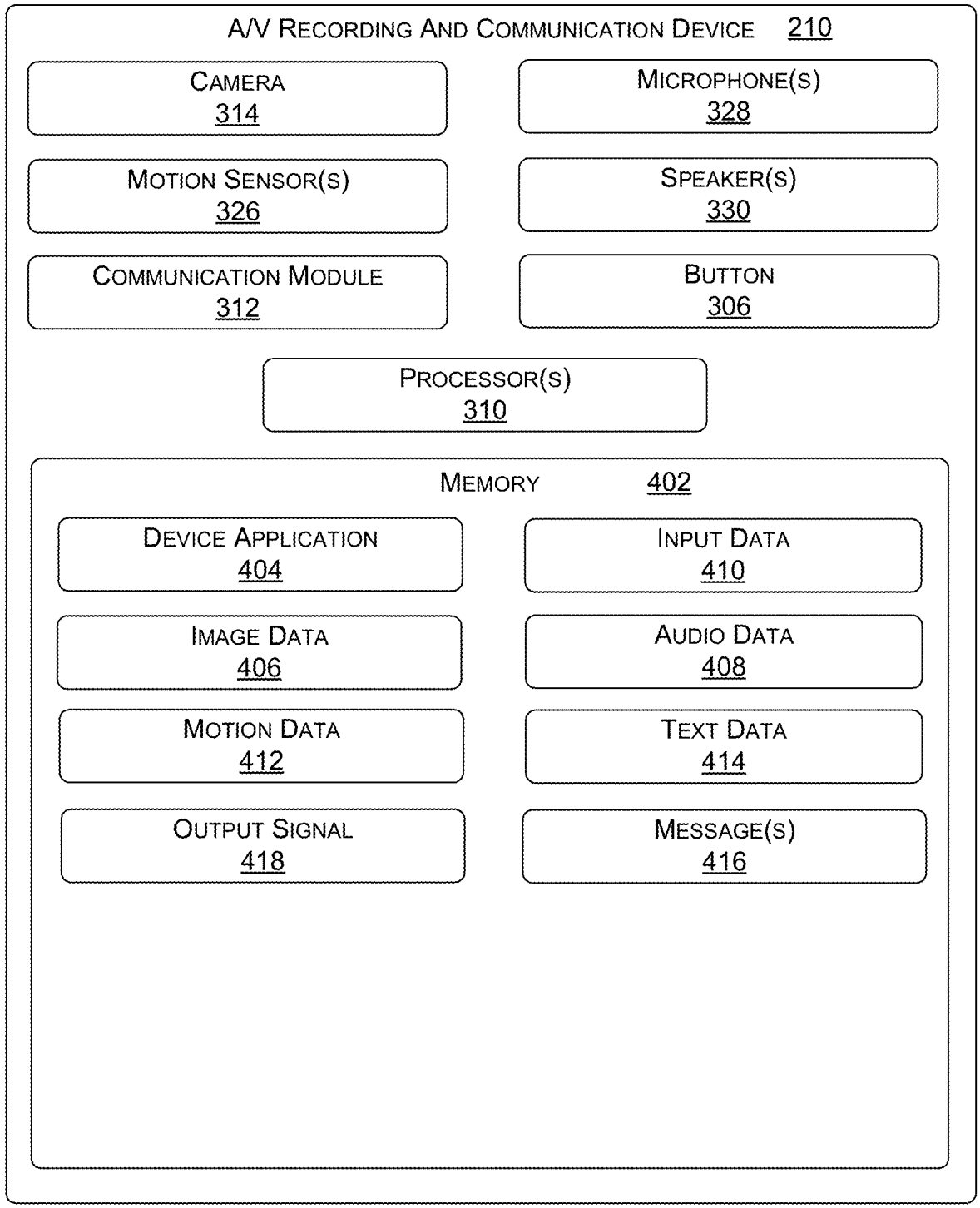
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia service (MMS) messages, voicemail messages, video signals, audio signals, data transmissions, and/or any other type of electronic communication that an electronic device can send to another electronic device.

The image data 406, the audio data 408, the text data 414, and/or the motion data 412 may be tagged (e.g., with a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210. For example, the A/V device 210 can determine a location of the sound source 102 using data that it has received in notifications from one or more other A/V devices.

In an embodiment, in response to detecting a sound by the microphone(s) 328 or otherwise, the processor(s) 310 may capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In another embodiment, the image data 406 may be captured in response to a communication sent from the network device 112 to the A/V recording and communication device 210. The network device 112 may send this communication based on a determination of the location of the sound source 102 of the sound.

In an embodiment, audio data 408 can include data associated with detection by microphone(s) 328 of a sound generated by source 102. The image data 406, the audio data 408, the text data 414, and/or the motion data 412 may also be tagged (e.g., with a time stamp, based on clock data) and/or stored separately (e.g., on the backend server 224, the hub device 202, and/or the A/V device 210) based on when the sound is detected (e.g., detected by microphone(s) 328).

In an embodiment, message(s) 416 can further include data related to or associated with detection of a sound. For example, a message can include a time stamp for a detected sound and an identification of an A/V device that has detected the sound.

Figure 5:
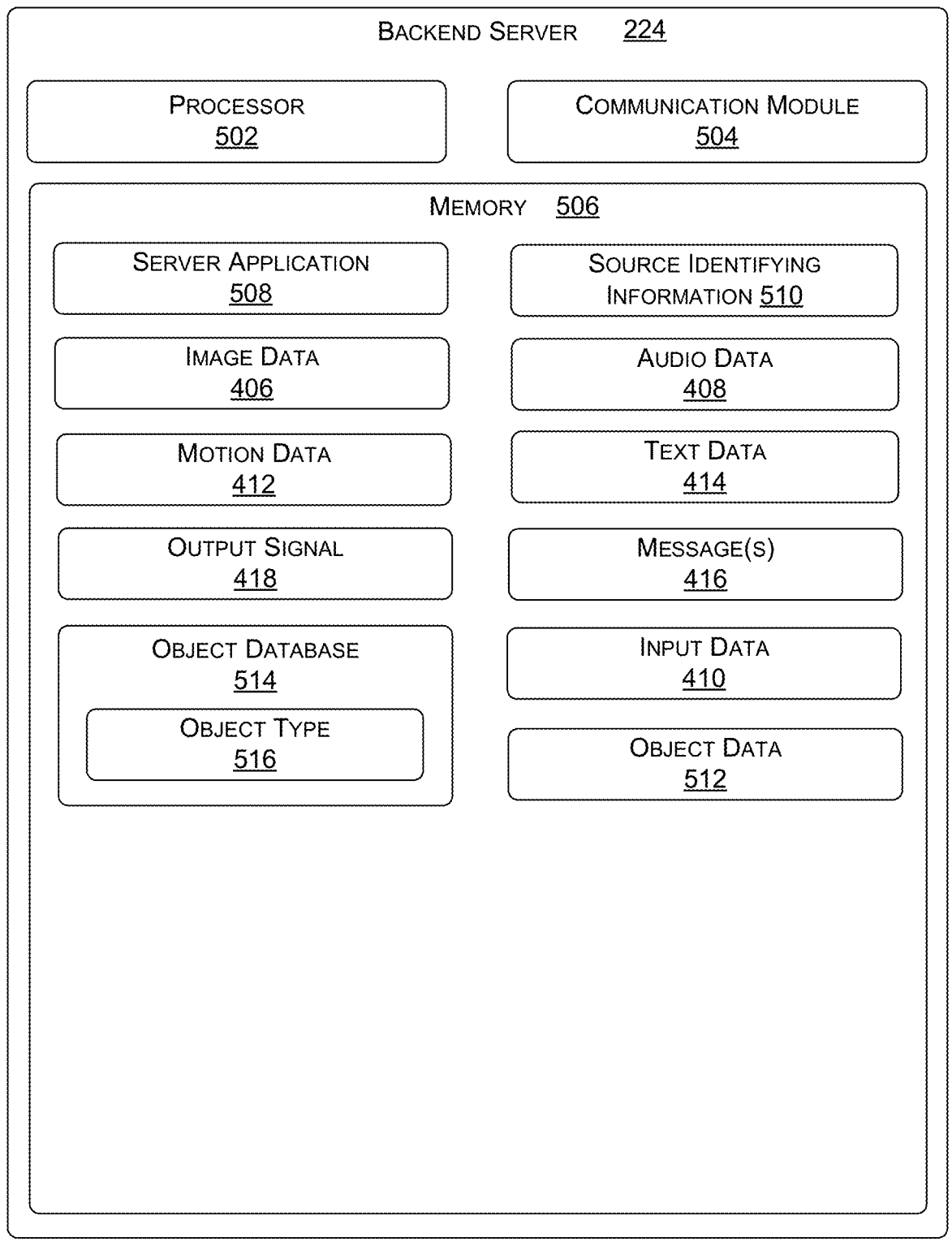
FIG. 5 is a functional block diagram illustrating one example embodiment of a backend device according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data generated by the A/V devices 230.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, and/or the text data 414.

As described herein, at least some of the processes of the A/V device 210, the hub device 202, and/or the client device 214, 216 may be executed by the backend server 224.

For example, the server application 508 may configure the processor(s) 502 to analyze the image data 406 in order to determine if the image data 406 depicts an object (e.g., an object that is a source of a sound). Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the backend server 224 may analyze the image data 406 whenever the backend server 224 receives the image data 406 from the A/V device 210.

In some examples, to analyze the image data 406, computer vision processing and/or image processing, as described herein, for example, may be performed by the processor(s) 502 of the backend server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparison, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively separate from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the backend server 224, in some embodiments, the image data 406 may be analyzed by any of the A/V recording and communication device 210, the hub device 202, and/or the client device 214, 216 in order to determine if the image data 406 depicts an object, therein. Thus, any or all of the operations described herein to analyze the image data 406 may be performed by any or all of these devices. To perform these operations, any or all of these devices may also include the object database 514, including the object type 516, and/or the object data 512, as described with reference to FIG. 5.

The hub device 202 and/or the backend server 224 (and/or one or more additional or alternative components of the network(s) of servers/backend devices 220) may alternatively be referred to herein as "network devices." In an embodiment, the backend server 224, the hub device 202, and/or another network device can perform some or all of the processing similarly as was described above for the network device 112 when determining a location of a source of sound based on sound detected by two or more computing devices (e.g., A/V recording and communication devices).

In an embodiment, the processor(s) 502 of the backend server 224 may additionally or alternatively match the object data 512 from the image data 406 (e.g., captured in response to detection of a sound and/or determination of a location of a source of a sound) to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person (e.g., a person that has yelled to create a sound), then the processor(s) 502 of the backend server 224 may determine that the image data 406 depicts an object and/or that the image data 406 depicts a person. In some examples, when the object data 512 represents multiple objects (e.g., a source of a detected sound, or a set of objects, one or more of which potentially may be the source of a detected sound), the processor(s) 502 of the backend server 224 may perform a similar analysis to identify each object represented by the object data 512 and/or the respective type of object 516 associated with each of the objects represented by the object data 512.

In an embodiment, the source identifying data 510 may be used to identify the A/V device 210 when data associated with sound detection is transmitted to another device. For example, the source identifying data 510 may accompany or be associated with a time stamp for a sound detection and a location of the respective A/V device that has detected the sound.

Figure 6:
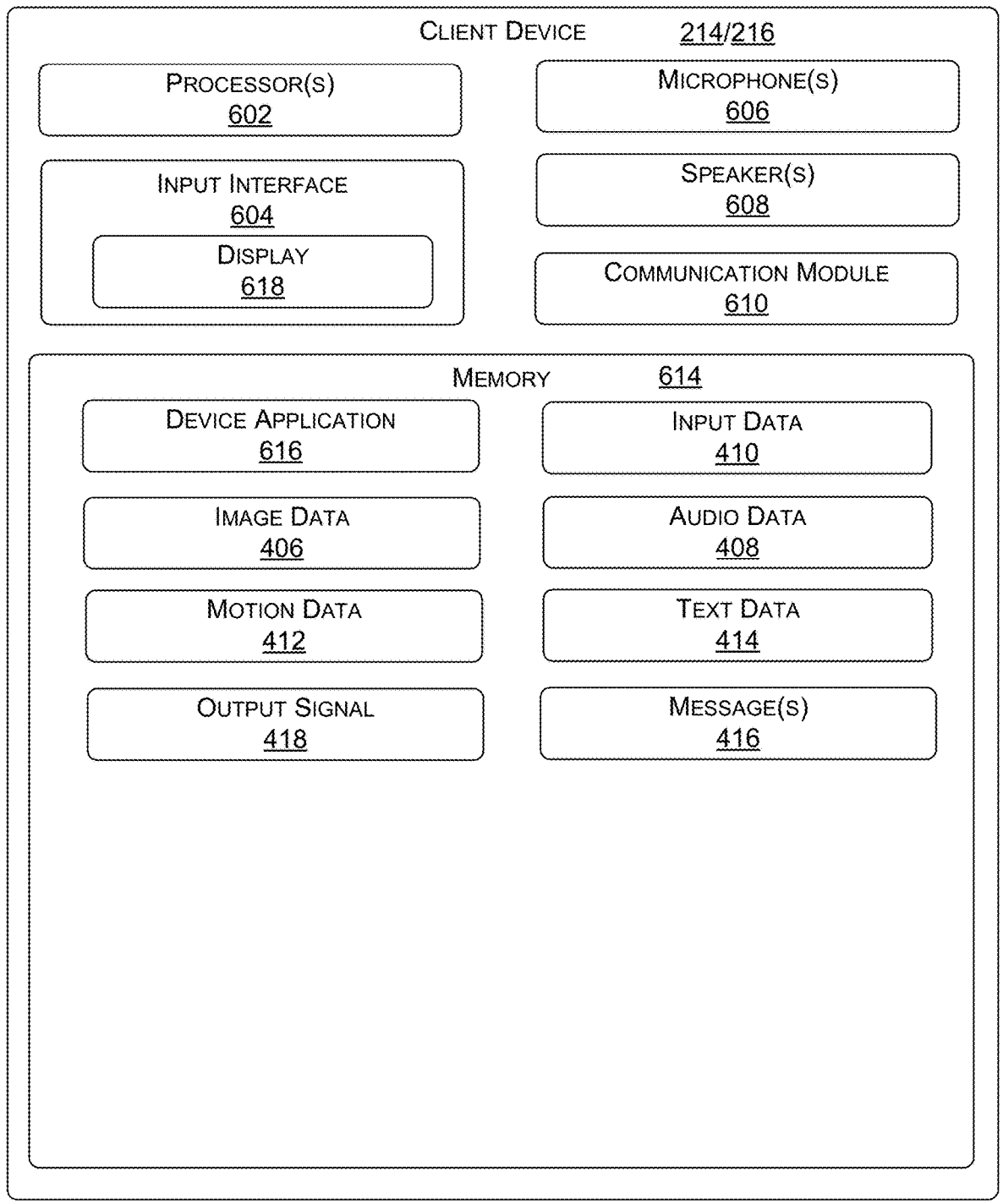
FIG. 6 is a functional block diagram illustrating one example embodiment of a client device according to various aspects of the present disclosure.

FIG. 6 is a functional block diagram illustrating one embodiment of the client device 214, 216 according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 614 may store a device application 616. In various embodiments, the device application 616 may configure the processor(s) 602 to receive input(s) to the input interface 604 (e.g., an input may be provided to cause the setting of a location for a source of sound, such as a smoke alarm, when the client device 214 or 216 is proximate to the source). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618 (e.g., the user can provide an input in response to display of a determined location of the sound source 102 of sound, for example to acknowledge receipt of an alert regarding a detected sound and/or to direct an action to be performed by a device, such as an A/V recording and communication device associated with the client device). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 616 may configure the processor(s) 602 to cause the display 618 to display the message 416. The message 416 may indicate that the A/V device 210 detected a sound, detected motion, detected the presence of an object, received an input (e.g., to the button 306), etc. While displaying the message 416, the input interface 604 may receive input from the user to answer the message 416. In response, the device application 616 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216. For example, processes associated with sound detection and/or source location as described above may be executed by the client device(s) 214, 216.

Figure 7:
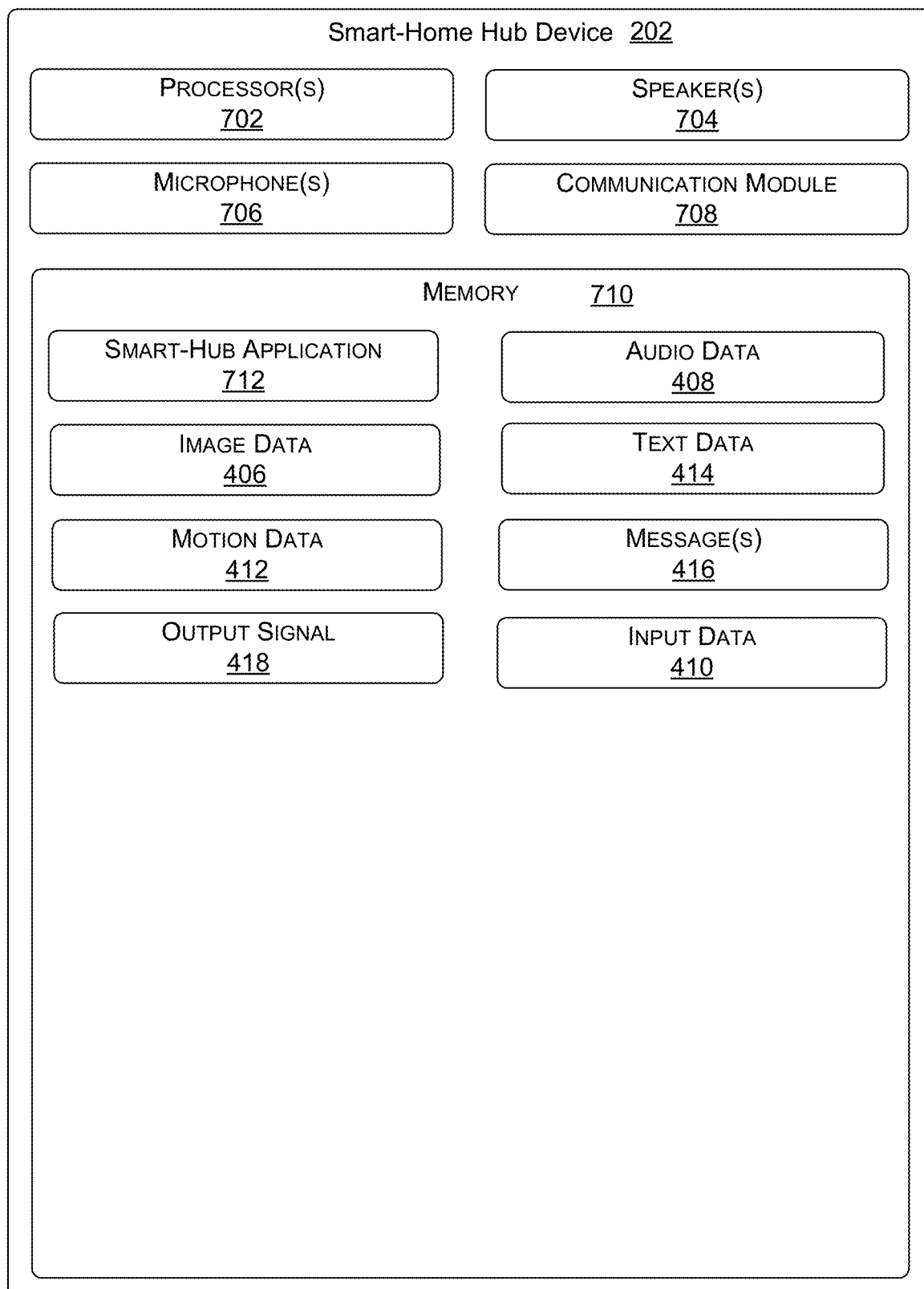
FIG. 7 is a functional block diagram illustrating one example embodiment of a smart-home hub device according to various aspects of the present disclosure.

FIG. 7 is a functional block diagram illustrating an embodiment of the smart-home hub device 202 according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more cameras (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the backend server 224) using the communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the backend server 224 in response to motion being detected by the A/V device 210. The smart-hub application 712 may then configure the processor(s) 702 to transmit, using the communication module 708, the audio data 408, the text data 414, the image data 406, the motion data 412, the input data 410, and/or the messages 416 to the client device 214, 216, the backend server 224, and/or an additional electronic device (e.g., a second A/V device 210, the automation device(s) 206, the sensor(s) 204, etc.).

As described herein, at least some of the processes of the A/V device 210, the backend server 224, and/or the client device 214, 216 may be executed by the hub device 202. For example, processes associated with sound detection and/or source location as described above for the network device 112 may be executed by the hub device 202.

In an embodiment, messages 416 include data associated with sound detection, similarly to data as described above for processing to determine a location of a source by the network device 112.

Figure 8:
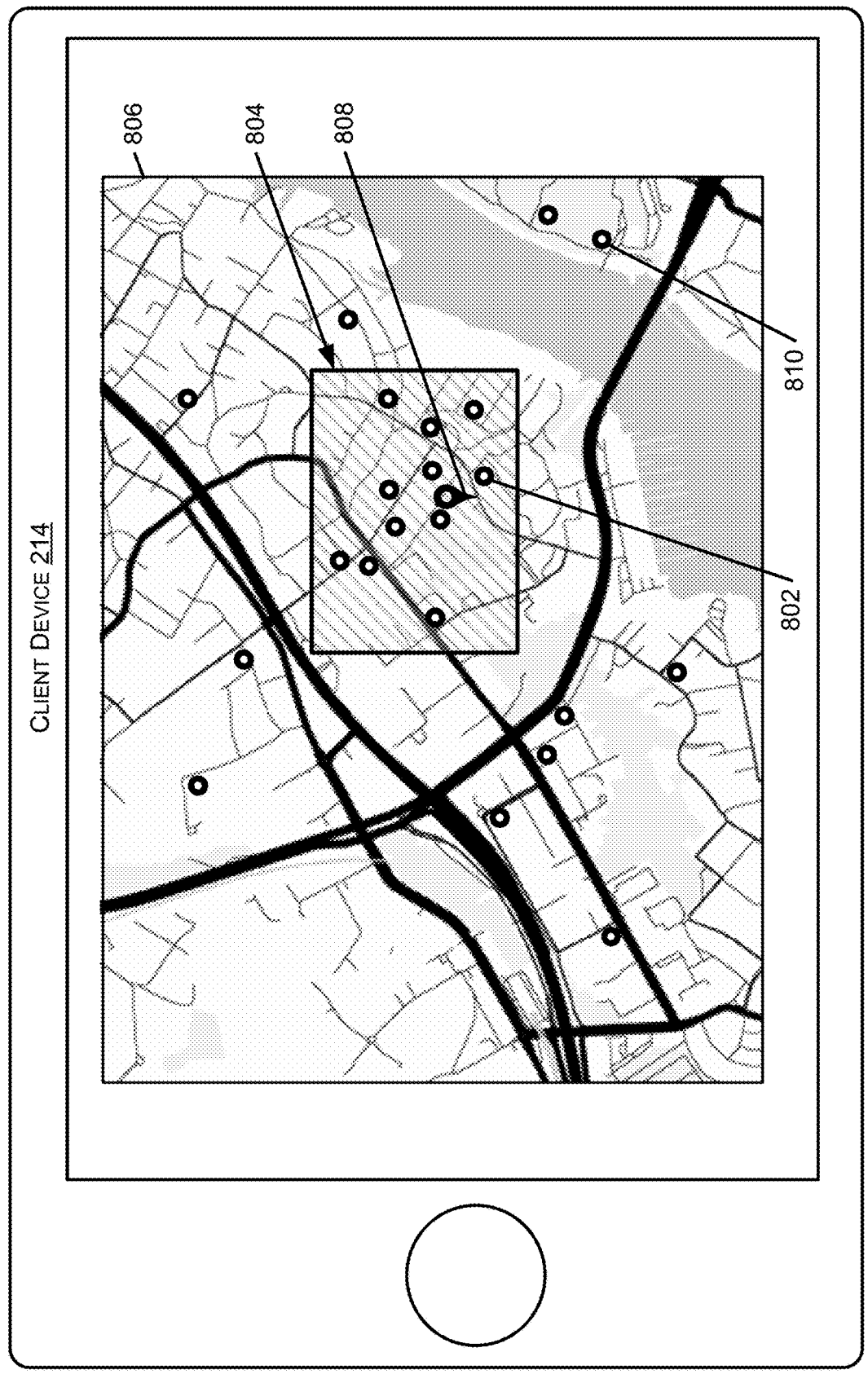
FIG. 8 illustrates an example of a geographic network, according to various aspects of the present disclosure.

FIG. 8 illustrates an example of a geographic network of users, according to various aspects of the present disclosure. In some examples, a geographic network may be executed by a geographic network platform, such as a geographic network platform operating on the backend server 224 and/or one or more other or additional components of the network of servers/backend devices 220. As such, the backend server 224 and/or one or more other or additional components of the network of servers/backend devices 220 may store and/or maintain the components, features, and/or functionality of the geographic network platform. In some examples, and without limitation, the geographic network may be a neighborhood-oriented or local-oriented network, such as Neighborhoods® or Nextdoor®. In other examples, and without limitation, the geographic network may be a social media network (or a feature within a social media network), such as Facebook®, Twitter®, or Instagram®.

The geographic network platform may enable users of the geographic network to share content (e.g., image data 406, audio data 408, text data 414, input data 410, motion data 412, and/or other data from the user's A/V device 210 and/or the user's client device 214, 216) with other users of the geographic network. The geographic network platform may allow users that are located within geographic area(s) to register with the geographic network to access content shared by other users within the geographic area(s). As such, the content that a particular user may have access to may be based on the user's location (e.g., the location of the user's residence, the location of one or more A/V devices associated with the user, the current location of the user (e.g., based on a location of the user's client device), etc.) and/or the location of the electronic device(s) (e.g., the A/V device 210, the client device(s) 214, 216, etc.) that generated the content. For example, users that are located in a geographic area may share content with other users in the geographic area and/or in a similar geographic area, and/or users may view content shared by other users that are located within his or her geographic area (e.g., a neighborhood, a town, a city, a state, a user-defined area, etc.) and/or in a similar geographic area.

In some examples, a user may register with the geographic network platform if the user has an A/V device and/or has an application (e.g., a mobile application, a web application, etc.) associated with the geographic network installed on and/or running on his or her client device. When registering for the geographic network, the user may register, or be required to register, with respect to a geographic area. In some examples, a user may register with the geographic area of the geographic network if the user's residence is located within the geographic area and/or the user has A/V device(s) located (e.g., installed) within the geographic area. In some examples, a user may be a member to one or more geographic areas of the geographic network.

In some examples, a user may be verified to a geographic area of the geographic network that the user is requesting to join. For example, to determine if the user is actually located within a geographic area, GNSS data of the user's A/V device may be used (e.g., during and/or after installation, provisioning, and/or setup of the A/V device). As another example, to determine if the user is actually located within a geographic area, GNSS data of the user's client device may be compared (e.g., over a period time) to an address input by the user. For example, if the user inputs an address, and the location of the user's client device is within a threshold proximity to the address (e.g., over the period of time, which may be, for example and without limitation, four hours, six hours, twenty-four hours, two days, etc.), the user may be verified to the address, and thus verified to the geographic area of the geographic network. A verified user may have full access to features of the geographic network, and/or full access to content shared by other users of the geographic network in the geographic area for which the user is verified. Non-verified users may have limited access to features and/or content of the geographic network. For example, non-verified users may only be able to view content, but not interact with (e.g., comment on, like, share, etc.) the content, and/or may not be able to share his or her own content. A single user may be a verified user of one geographic area of the geographic network and may be a non-verified user of a second geographic area of the geographic network.

In some examples, a provider of the geographic network platform (e.g., hosted on the backend server 224) may receive shared content from any user that is associated with the provider and/or the geographic network, but each individual user may only share content with and/or view content shared from other users within a geographic area of the user. As a result, content provided to and/or made available to each user by the geographic network platform may be unique to each user (e.g., based on the unique location of the user's residence and/or the user's A/V devices, etc.), and/or unique to a geographic area (e.g., all users associated with a geographic area of the geographic network).

In one illustration of a geographic network, the geographic network platform may facilitate a content feed to allow a user of the geographic network to post videos, photos, text, and/or other data to alert other members of possible suspicious activity in a geographic area. Additionally, or alternatively, news items, police-sourced information, and/or other third-party data may be posted to the content feed of the geographic network (e.g., by the users and/or by the provider of the geographic network (e.g., the host of the geographic network platform)), that are related to crime and/or safety of the geographic area (e.g., restricting news items to those related to the geographic area). Members of the geographic network may rate, like, dislike, comment, download, share an existing post/alert with others, and/or upload a new post/alert to the content feed to provide additional information for other users.

A geographic area of a geographic network may be defined using various methods. For example, a geographic area may be associated with one or more neighborhoods, towns, zip codes, cities, states, or countries. In another example, a geographic area may be determined by the backend server 224 based on grouping a particular number of A/V devices or client devices about a particular vicinity. In a further example, a user may customize a geographic area (e.g., by drawing the geographic area on a map, by providing a radius from the user's property for which the user would like to view shared content, by positioning a boundary (e.g., using markers to define a polygon) of the geographic area over a map, etc.). In such an example, the user's geographic area may be unique to the user.

For example, and as illustrated in FIG. 8, a portion of the geographic network is shown. With reference to FIG. 8, and during a setup or registration process with the geographic network, the location 808 to be associated with the user of the client device 214 may be determined (e.g., based on an address being input by the user, based on a determination of the location of the client device 214, based on the location of the A/V device(s) 210 associated with the user (in examples where the user 214 has one or more A/V devices 210), etc.). In some examples, the user may then be associated with the geographic area 804 of the geographic network, such as based on the neighborhood, town, city, zip code, state, country, or other area in which the user is located. In one example, the geographic area 804 may be the town in which the location 808 associated with the user is located. In other examples, the user may define, on the map 806, the geographic area 804 of the geographic network that the user wishes to have access to content, which may include the location 808 associated with the user. To define the geographic area 804, the user may overlay a predefined shape on the map 806 (e.g., a rectangle, as shown, a circle, a triangle, a square, a polygon, etc.), may position any number of vertices to define a polygon on the map 806, may define a radius about the location 808 associated with the user, may draw the geographic area 804 on the map, etc. The geographic network may limit the size of the geographic area 804 for the user. The size may be limited to a maximum distance in any direction from the location 808 (e.g., a radius) associated with the user of less than, for example and without limitation, two miles, five miles, ten miles, fifteen miles, fifty miles, or the like.

Although the geographic area 804 includes the geographic network from which the user may desire to view content, the content shared by the user may be shared with a larger, smaller, and/or different geographic area of the geographic network than the geographic area 804. For example, the geographic area 804 may include the geographic area in which the user can view content, but any users located within the entire portion of the map 806 displayed on the client device 214 may be able to view content shared by the user of the client device 214 (e.g., depending on the geographic areas defined by and/or associated with the other users located within the portion of the map 806). For example, users of the geographic network having associated location(s) 810 outside of the geographic area 804 may be able to view the content shared by the user of the client device 214, but the user of the client device 214 may not be able to view, or may choose not to view (e.g., by defining the geographic area 804 that does not include the locations 810), the content shared by the user(s) associated with the location(s) 810. In other examples, the geographic area 804 from which the user of the client device 214 desires to view content may also be the same geographic area 804 in which users can view content shared by the user of the client device 214. For example, where the geographic area 804 is a town, each of the users located within the town may only be able to view and share content with each other user located in the town. As another example, where the geographic area 804 is defined by the user of the client device 214, the user of the client device 214 may only be able to view content by the users who are located within the geographic area 804 and the users within the geographic area 804 may be the only users that can view content shared by the user of the client device 214.

With further reference to FIG. 8, and during use of the geographic network platform by the user of the client device 214, the user may access a GUI on the client device 214 (e.g., within a mobile or web application). The user may desire to view shared content from users of the geographic area 804 of the geographic network. As such, the icons illustrating the locations 802 may be included within the geographic area 804 because data generated by client devices and/or A/V devices of users associated with the locations 802 may be available for viewing. In some examples, the icons may be included because the content has not yet been viewed by the user, because the content was shared within a time period (e.g., within the last day, within the last two days, within the last week, etc.), and/or based on other criteria. The user may select the icons, and in response, the user may receive the content (e.g., the image data, audio data, the text data, etc.) associated with the icons (e.g., from the backend server 224). Although illustrated as icons on a map, in some examples, the content may additionally, or alternatively, be provided as a list. For example, the list may include text describing the content (e.g., date, time, description, location (e.g., as a selectable icon, that when selected may allow the user to view the location on a map), etc.), and individual listings may be selectable, similar to the icons on the map 806.

In an embodiment, the geographic network platform may enable users of the geographic network to share content associated with the detection of a sound and/or the determination of a location of a source of the sound (e.g., image data 406, audio data 408, text data 414, input data 410, motion data 412, and/or other data from the user's A/V device 210 and/or the user's client device 214, 216) with other users of the geographic network. The content that a particular user may have access to may be based on the user's location (e.g., the location of the user's residence, the location of one or more A/V devices associated with the user, the current location of the user (e.g., based on a location of the user's client device), etc.) and/or the location of the electronic device(s) (e.g., the A/V device 210, the client device(s) 214, 216, etc.) that detect a sound and/or process audio data from the sound to determine a location of the source of the sound.

Each of the processes described herein, including the processes 900 and 1100, is illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 9A:
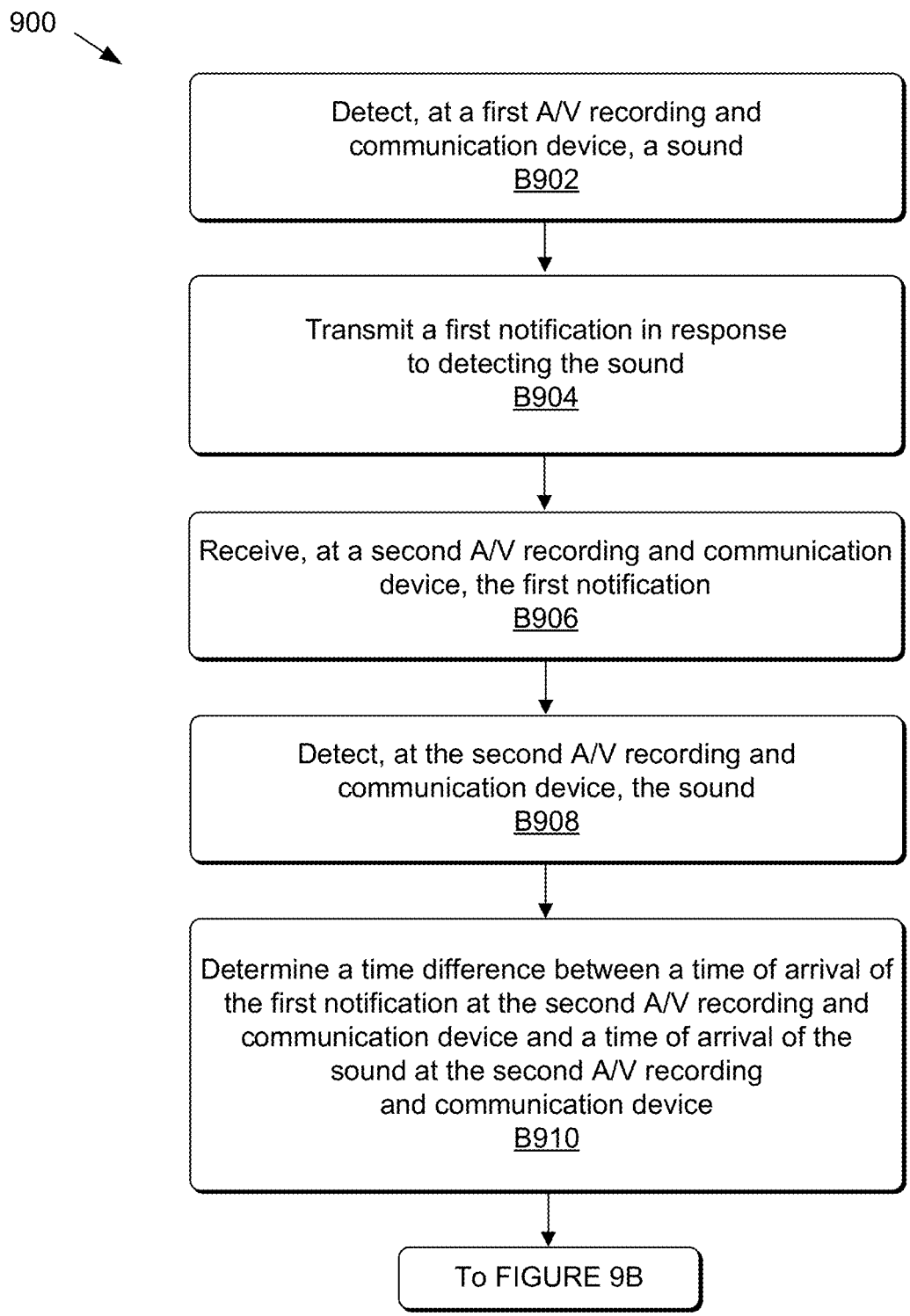
FIGS. 9A-9B are a flowchart illustrating an example process for locating a source of a sound, according to various aspects of the present disclosure.
Figure 9B:
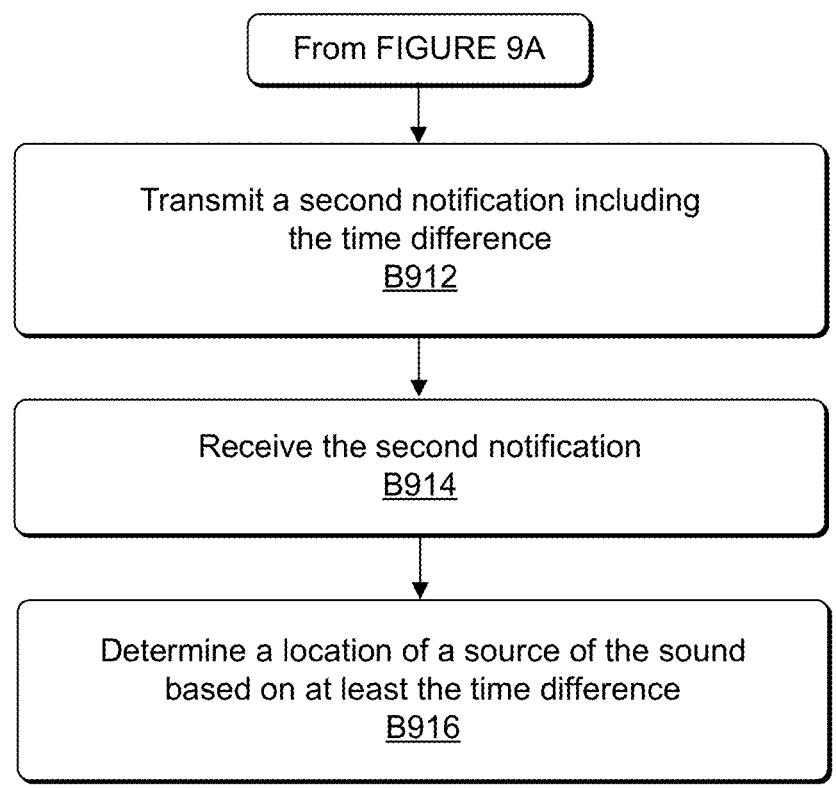

FIGS. 9A-9B provide a flowchart illustrating an example process 900 for locating a source of a sound, according to various aspects of the present disclosure. In the process 900, at block B902, a sound is detected at a first A/V recording and communication device. For example, with reference to FIG. 1, the sound is generated by the sound source 102 and detected by the first computing device 110, which represents the first A/V recording and communication device. As discussed above, the computing devices 104-110 may comprise any electronic device having at least a microphone and a radio. Non-limiting examples include an A/V recording and communication device that includes a microphone to detect the sound and a radio (e.g., an RF transceiver, or an RF transmitter and an RF receiver, etc.). In other non-limiting examples, one or more of the computing devices 104-110 may instead comprise a smart-home device (e.g., a hub device, a sensor device, an automation device, a virtual assistant (VA) device, etc.). For simplicity, the computing devices 104-110 may be referred to in the descriptions of the processes 900, 1100 as A/V recording and communication devices, but this label should not be construed as limiting.

In the process 900, at block B904, a first notification is transmitted in response to detecting the sound. For example, the first notification is transmitted by the computing device 110 in response to detecting the sound by a microphone of the computing device 110. The first notification may be transmitted to, and received by, at least one of the other computing devices 104-108 and/or the network device 112.

In the process 900, at block B906, the first notification is received at a second A/V recording and communication device. For example, the first notification is received by the computing device 106, which represents the second A/V recording and communication device.

In the process 900, at block B908, the sound is detected at the second A/V recording and communication device. For example, a microphone of the computing device 106 detects the sound from the sound source 102.

In the process 900, at block B910, a time difference between a time of arrival of the first notification at the second A/V recording and communication device and a time of arrival of the sound at the second A/V recording and communication device is determined. For example, the time of arrival of the first notification at the computing device 106 is determined based on a time stamp applied by the computing device 106 when the first notification is received. The time of arrival of the sound at the second A/V recording and communication device is determined based on a time stamp applied by the computing device 106 when the sound is detected. The time difference may be determined, for example, by calculating the difference in time between the time stamps.

In the process 900, at block B912, a second notification including the time difference is transmitted. In one example, the time difference is determined by the computing device 106 and transmitted in a message to the network device 112.

In an alternative embodiment, the time difference is determined by the network device 112 instead of by the computing device 106. For example, the network device 112 receives two time stamps from the computing device 106, and then uses the two time stamps to calculate the time difference. Thus, the transmitting of a time difference from the computing device 106 in the second notification may be omitted.

In the process 900, at block B914, the second notification is received. For example, the network device 112 receives the message from the computing device 106. The message may include a time difference determined by the computing device 106.

In the process 900, at block B916, a location of the source of the sound is determined based on at least the time difference. For example, the network device 112 determines a location of the sound source 102 based on the time difference. In some cases, the time difference is received in a message from the computing device 106. In other cases, the time difference is calculated by the network device 112. In one example, the network device 112 determines a location of the sound source 102 further based on additional data received from the computing device 108 and/or the computing device 104, the additional data being associated with detection of the sound from the sound source 102 by the computing device 108 and/or the computing device 104.

In an embodiment, the backend server 224 may determine a location of the sound source 102 based on at least a location of the first A/V recording and communication device (e.g., the computing device 110), a location of the second A/V recording and communication device (e.g., the computing device 106), and the time difference between the time of arrival of the first notification at the second A/V recording and communication device and the time of arrival of the sound at the second A/V recording and communication device. In various embodiments, the backend server 224 may determine the location of the sound source 102 using the additional data from additional computing devices, as described above, where each of the reporting computing devices provides to the backend server 224 a time difference between when the respective computing device received the notification from the first computing device and when the respective computing device detected the sound. If at least three computing devices provide the time difference data to the backend server 224, the location of the sound source 102 can be computed very accurately using the known locations of the four computing devices (the first computing device that heard the sound, and the three additional computing devices that heard the sound and received the notification from the first computing device). Of course, if fewer than three computing devices provide the time difference data to the backend server 224, the location of the sound source 102 can still be computed, albeit with less accuracy. The locations of the A/V recording and communication devices may be stored in a database accessible by the backend server 224. The locations may be determined using a client device similarly as described above for determining a location for a source of sound (e.g., a smoke alarm).

Figure 10:
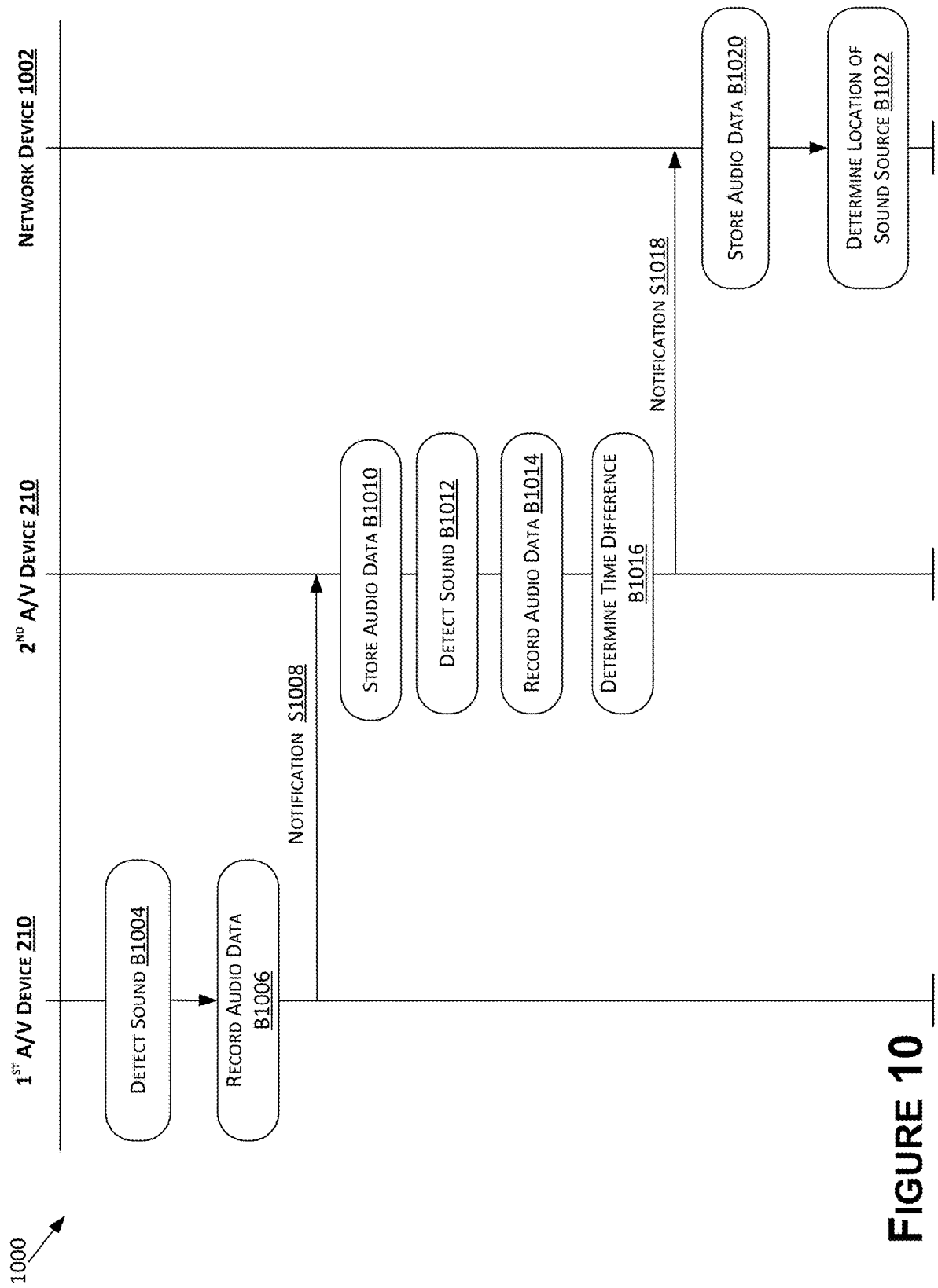
FIG. 10 is a signal diagram of a process for locating a source of a sound using microphones and radio frequency communication, according to various aspects of the present disclosure.

FIG. 10 is a signal diagram of a process 1000 for locating a source of a sound using microphones of a first A/V recording and communication device 210 and a second A/V recording and communication device 210 that are in radio frequency communication, according to various aspects of the present disclosure. At least the second A/V recording and communication device 210 is also in radio frequency communication with a network device 1002. The network device 1002 is an example of the network device 112. The network device 1002 may include one or more of the hub device 202, the VA device 208, and/or any of the components of the network(s) of servers/backend devices 220 (e.g., the backend server 224, the backend API 226, the storage devices 222, etc.).

In the process 1000, at block B1004, a sound is detected. For example, the first A/V recording and communication device 210 may detect the sound using a microphone. The source of the detected sound is, for example, the sound source 102.

In the process 1000, at block B1006, audio data is recorded. For example, the first A/V recording and communication device 210 may record the audio data in response to detecting the sound. Additionally and/or alternatively, in one example, the audio data is data that was collected by the first A/V recording and communication device 210 and was used, at least in part, to detect the sound.

In the process 1000, at signal S1008, a notification is transmitted. For example, the notification is transmitted to the second A/V recording and communication device 210. The notification may include audio data collected by the microphone of the first A/V recording and communication device 210. For example, the audio data may be an audio clip of a sound that has been detected. In another example, the notification may alternatively and/or additionally include data that characterizes the detected sound (e.g., the notification can include a code that corresponds to a type of sound detected, and/or an identifier that corresponds to sound data that has been selected from a library, look-up table, and/or database in response to detecting a new sound).

In one example, the first A/V recording and communication device 210 can detect multiple sounds, and the notification includes an audio clip, data identifying or characterizing the sound, and/or identifier or code for each of the sounds detected. In another example, the first A/V recording and communication device 210, using the communication module 312, may transmit the notification to the second A/V recording and communication device 210. The notification may be transmitted, for example, by a radio transmitter of the first A/V recording and communication device 210. In one example, the second A/V recording and communication device 210 may receive the audio data using a radio receiver.

In the process 1000, at block B1010, audio data is stored. For example, the audio data is received from the first A/V recording and communication device 210. In one example, the second A/V recording and communication device 210 may store the audio data for future access by the network device 1002 (e.g., the audio data may be stored using cloud storage). In some embodiments, the second A/V recording and communication device 210 may store the audio data locally (e.g., in memory). In some embodiments, the audio data may not be stored, except during buffering, compression, and/or live (or near-live) streaming of the audio data to the network device 1002. In such embodiments, at the conclusion of determining the location of the sound source, the audio data may be deleted from the second A/V recording and communication device 210.

In the process 1000, at block B1012, a sound is detected. For example, the sound detected is the same sound originating from the sound source 102 that was detected by the first A/V recording and communication device 210. The sound is detected, for example, based on audio data collected by one or more microphones of the second A/V recording and communication device 210.

In the process 1000, at block B1014, audio data is recorded. For example, the second A/V recording and communication device 210 collects the audio data using a microphone. In one example, the audio data is collected after receiving the notification from the first A/V recording and communication device 210. In one example, at least a portion of the recorded audio data is data that was used to detect the sound at block B1012.

In the process 1000, at block B1016, a time difference is determined. For example, the second A/V recording and communication device 210 determines a time difference between the time of arrival of the notification at signal S1008 at the second A/V recording and communication device 210 and a time of arrival of the sound at the second A/V recording and communication device 210. In one example, the time of arrival of the sound is determined by a time stamp provided by a processor of the second A/V recording and communication device 210 when the sound is detected at block B1012.

In the process 1000, at signal S1018, a notification is transmitted. In an embodiment, the notification includes the time difference determined at block B1016. For example, the notification is transmitted by the second A/V recording and communication device 210 to the network device 1002. In one example, the notification includes at least a portion of the audio data recorded at block B1014 and/or the audio data stored at block B1010.

In the process 1000, at block B1020, audio data is stored. For example, the network device 1002 may store audio data received from the second A/V recording and communication device 210. In one example, the audio data is included with the notification received at signal S1018.

In the process 1000, at block B1022, a location of the sound source is determined based on at least a time difference. In one example, the sound source is the sound source 102. In one example, the time difference is a difference between a time of arrival of the notification at the second A/V recording and communication device 210 and a time of arrival of the sound at the second A/V recording and communication device 210. In one example, the time difference is determined by the network device 1002 based on a time difference received from the second A/V recording and communication device 210 as part of the notification at signal S1018. In one example, the location is determined based on at least a location of the first A/V recording and communication device 210, a location of the second A/V recording and communication device 210, and the time difference.

Figure 11:
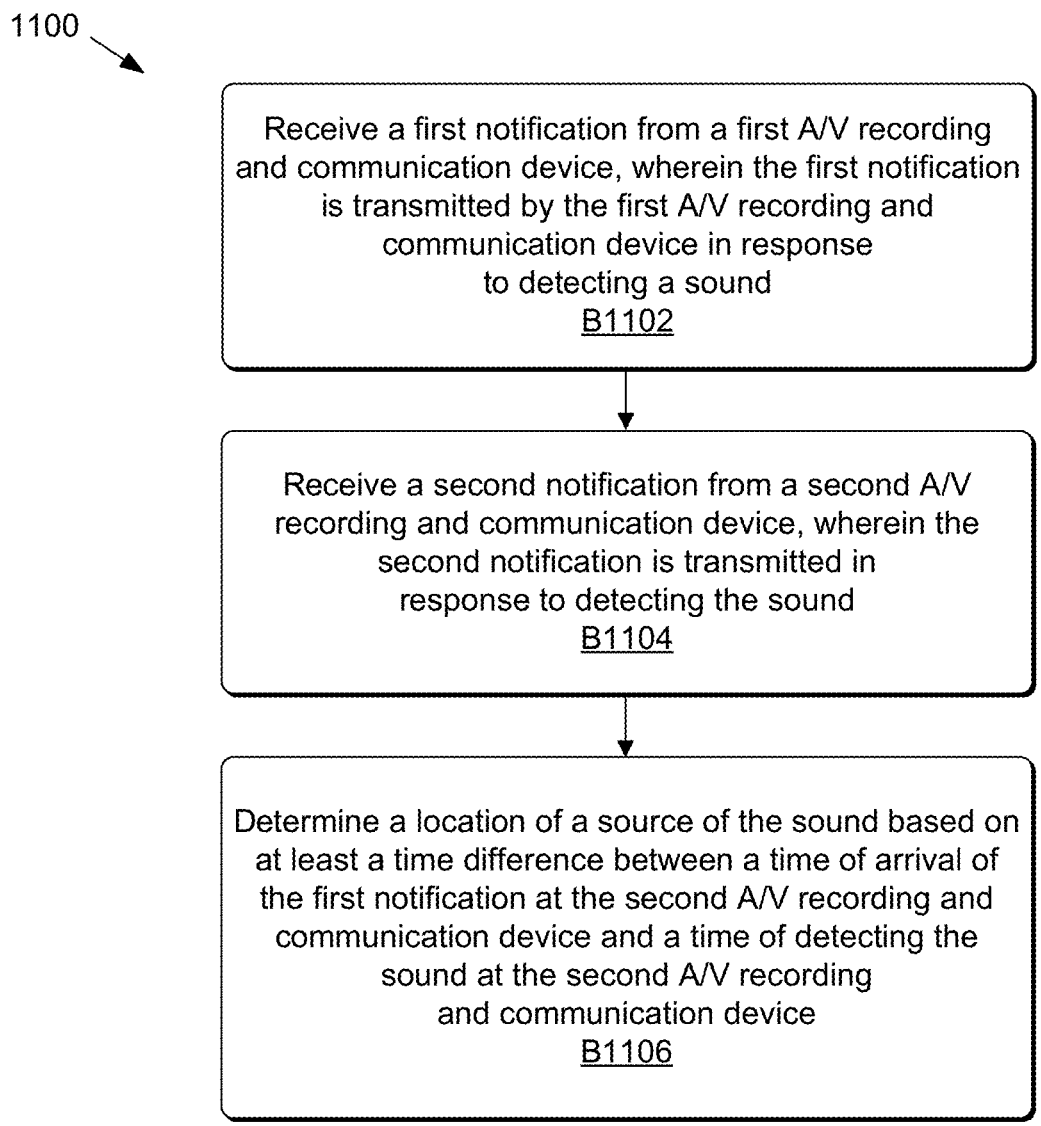
FIG. 11 is a flowchart illustrating another example process for locating a source of a sound, according to various aspects of the present disclosure.

FIG. 11 is a flowchart illustrating an example process 1100 for locating a source of a sound, according to various aspects of the present disclosure. In the process 1100, at block B1102, a first notification is received from a first A/V recording and communication device. The first notification is transmitted by the first A/V recording and communication device in response to detecting a sound. For example, the first computing device 110 may represent the first A/V recording and communication device. A sound from the source 102 may be detected by the computing device 110, which transmits the first notification in response to detecting the sound. The first notification may be transmitted to the network device 112 and/or the computing device 106.

In the process 1100, at block B1104, a second notification is received from a second A/V recording and communication device. The second notification is transmitted in response to detecting the sound. For example, the computing device 106 may represent the second A/V recording and communication device. The second notification may be transmitted by the computing device 106 to the network device 112.

In the process 1100, at block B1106, a location of a source of the sound is determined based on at least a time difference between a time of arrival of the first notification at the second A/V recording and communication device and a time of detecting the sound at the second A/V recording and communication device. For example, the network device 112 may determine the location of the sound source 102 based on the time difference. The time difference may be determined, for example, by the network device 112 and/or by the computing device 106.

In one example, the network device 112 receives a third notification from a third A/V recording and communication device (e.g., computing device 108). The third notification includes a time difference between a time of arrival of the first notification at the third A/V recording and communication device and a time of detecting the sound at the third A/V recording and communication device. The first notification is transmitted from the computing device 110. The network device 112 determines the location of the sound source 102 further based on at least a location of the third A/V recording and communication device and the time difference between the time of arrival of the first notification at the third A/V recording and communication device and the time of detecting the sound at the third A/V recording and communication device.

In one example, the network device 112 further receives a fourth notification from a fourth A/V recording and communication device (e.g., computing device 110). The fourth notification includes a time difference between a time of arrival of the first notification at the fourth A/V recording and communication device and a time of detecting the sound at the fourth A/V recording and communication device. The network device 112 determines the location of the sound source 102 further based on at least a location of the fourth A/V recording and communication device and the time difference between the time of arrival of the first notification at the fourth A/V recording and communication device and the time of detecting the sound at the fourth A/V recording and communication device.

In an embodiment, the time of arrival of the first notification at the second A/V recording and communication device and/or the time of detecting the sound at the second A/V recording and communication device are each determined based on a network time protocol. For example, one or more time stamps are determined using data obtained by a processor from the network time protocol. In one example, a networking protocol is used to maintain clock synchronization between computing devices (e.g., at least one of the computing devices 104-110 and/or the network device 112) that are communicating over packet-switched, variable-latency data networks.

In an embodiment, in response to determining the location of the source of the sound, the location of the source of the sound is transmitted to an A/V recording and communication device (e.g., the computing device 108). The location may be used in directing or controlling a camera of the A/V recording and communication device to record image data. For example, a field of view of the camera may be controlled to move and be directed toward the location of the sound source. The camera may record and transmit the image data to a computing device, such as the network device 112. The image data may be representative of one or more images of a perpetrator that caused the sound (e.g., a person that has fired a gun).

Figure 12:
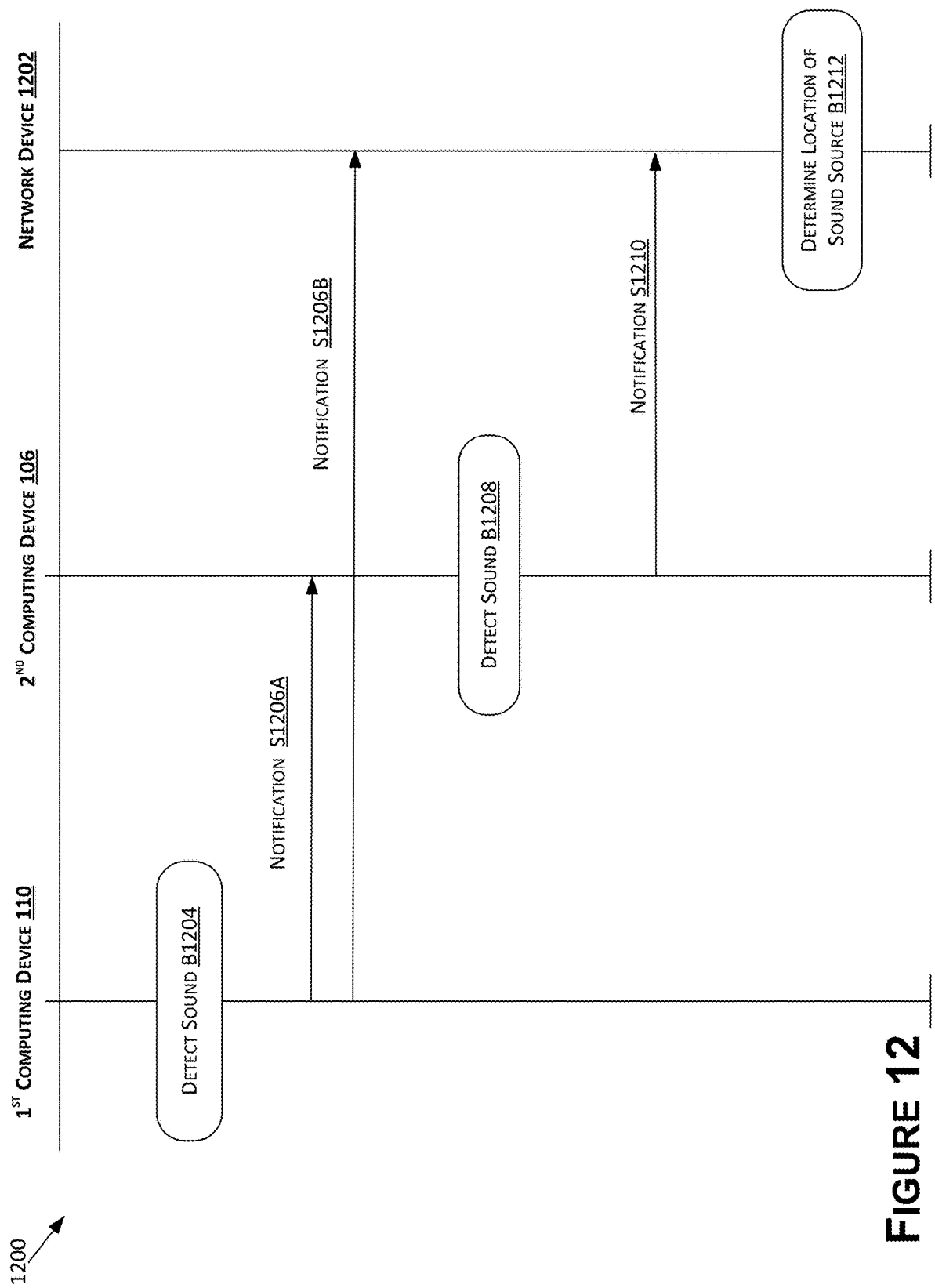
FIG. 12 is a signal diagram of another process for locating a source of a sound using microphones and radio frequency communication, according to various aspects of the present disclosure.

FIG. 12 is a signal diagram of a process 1200 for locating a source of a sound using microphones and radio frequency communication according to various aspects of the present disclosure. In the process 1200, the sound source is located using microphones of the first computing device 110 and the second computing device 106, which are in radio frequency communication. At least the second computing device 106 is also in radio frequency communication with a network device 1202. The network device 1202 is an example of the network device 112. The network device 1202 may include one or more of the hub device 202, the VA device 208, and/or any of the components of the network(s) of servers/backend devices 220 (e.g., the backend server 224, the backend API 226, the storage devices 222, etc.).

In the process 1200, at block B1204, a sound is detected. For example, the first computing device 110 may detect the sound using a microphone. The source of the detected sound is, for example, the sound source 102.

In the process 1200, at signals S1206A and S1206B, a notification is transmitted by the first computing device 110. For example, the notification is received by both the second computing device 106 and the network device 1202. In some embodiments, the notification sent to each device may include respective information that differs for each device (e.g., audio data customized for further processing by the receiving device).

In one example, the notification is transmitted to the network device 1202 by the first computing device 110 in response to detecting the sound at block B1204. The notification may include audio data collected by a microphone of the first computing device 110. For example, the first computing device 110, using the communication module 312, may transmit a notification at signal S1206B to the network device 1202. The notification may be transmitted, for example, by a radio of the first computing device 110. A radio receiver of the network device 1202 receives the audio data.

In the process 1200, at block B1208, a sound is detected. For example, the sound detected originates from the same source as the sound detected by the first computing device 110. For example, the sound is detected at block B1208 after, such as in response to, receiving the notification at signal S1206A. The sound is detected at block B1208, for example, based on audio data collected by a microphone of the second computing device 106.

In the process 1200, at signal S1210, a notification is transmitted. For example, the notification is transmitted by the second computing device 106 to the network device 1202 in response to detecting the sound at block B1208. In one example, the notification is a radio frequency signal.

In the process 1200, at block B1212, a location of the sound source is determined based on at least a time difference. In one example, the sound source is the sound source 102. The location is determined, for example, in response to receiving the notification at signal S1210 and/or in response to receiving the notification at signal S1206B. In one example, the time difference is a difference between a time of arrival at the second computing device 106 of the notification at signal S1206A and a time of arrival of the sound at the second computing device 106.

In one example, the time of arrival of the sound at the second computing device 106 is determined based on a time stamp retrieved in response to detecting the sound at block B1208. In one example, the time of arrival at the second computing device 106 of the notification at signal S1206A is determined based on a time stamp retrieved by a processor of the second computing device 106 in response to receiving the notification at signal S1206A from the first computing device 110.

In one example, the location of the sound source is determined based on at least a location of the first computing device 110, a location of the second computing device 106, and the time difference as calculated by the network device 1202. In another example, the time difference can be calculated by the second computing device 106 and sent with the notification at signal S1210.

As discussed above, the occurrence of an event that causes a sound (e.g., a gunshot, an activated smoke alarm, or a person yelling) in the proximity of a home or business location may indicate a potentially dangerous situation. The failure to determine a location of the source of the sound (e.g., the location where the gun was shot, the location of the smoke alarm that was activated, or the location where the person yelled) may prevent taking protective or other measures that are appropriate for this type of situation.

As also discussed above, when coordinating processing and/or communication by two or more computing devices used to locate a source of a sound, it is difficult to time-synchronize the devices. For example, without sufficient time synchronization, timing differences between computing devices can introduce errors when calculating or otherwise determining the location of the sound source.

Various embodiments solve these problems by using microphones of computing devices that are in radio frequency communication and that are positioned at differing locations to detect the sound. For example, at least one of the computing devices may be an A/V recording and communication device, a virtual assistant device, a home security hub, and/or a sensor, etc. In an embodiment, the location of a source of the sound is determined based on detecting the sound by two or more of the computing devices, and based on radio frequency signals transmitted, and received, by the computing devices. For example, the sound may be detected by one or more of the computing devices based on analysis of, and/or other processing of, audio data collected by microphones of the computing devices and/or processing of other data (e.g., data received by a computing device other than from a microphone). In one example, the location of the sound source 102 is determined based on audio data collected by the microphone(s) 328 in at least one of the A/V recording and communication devices (e.g., A/V recording and communication device 210). In response to determining the location of the sound source 102, one or more communications are transmitted. For example, a radio frequency signal can be sent from at least a first one of the computing devices with the signal indicating that a sound was detected. In some cases, the signal can include time and/or location information associated with the detection of the sound (e.g., audio data collected from the microphone of the detecting computing device, where the audio data characterizes the type of sound detected, etc.). One or more other responsive actions may be additionally performed (for example as described above). The location of the sound source 102 is determined based on at least a time difference between a time that a notification from a first A/V recording and communication device (e.g., the computing device 110) regarding the sound arrives at a second A/V recording and communication device (e.g., the computing device 106) and a time of detecting the sound at the second A/V recording and communication device.

Figure 13:
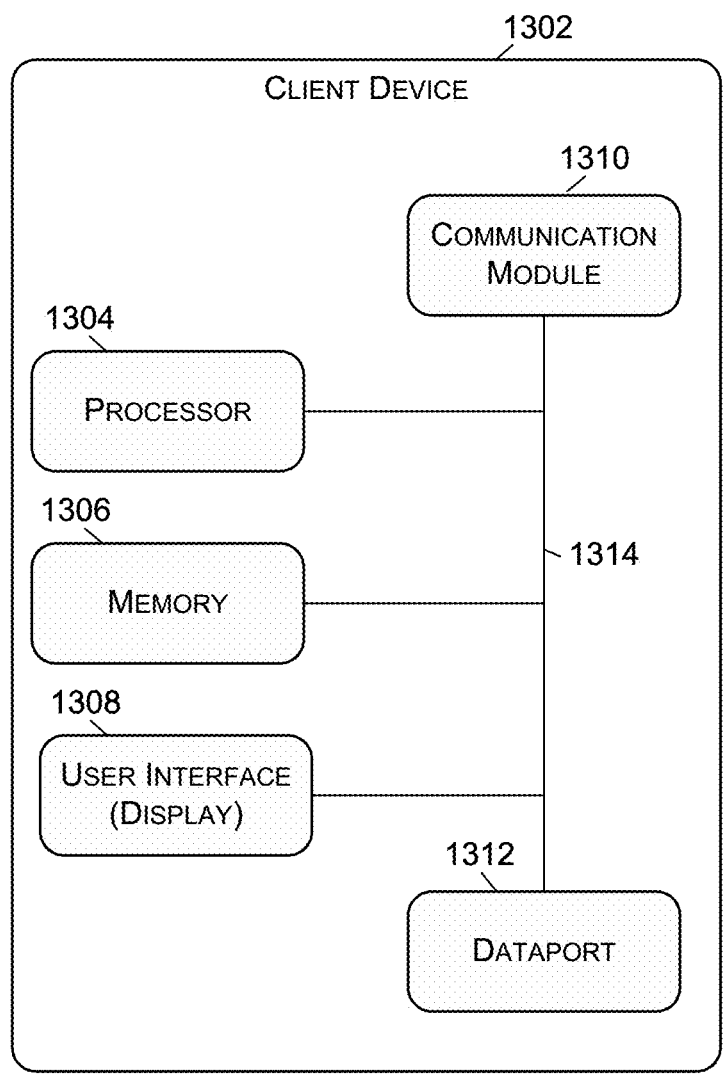
FIG. 13 is a functional block diagram of a client device on which the present embodiments may be implemented according to various aspects of the present disclosure.

FIG. 13 is a functional block diagram of a client device 1302 on which the present embodiments may be implemented according to various aspects of the present disclosure. The client device(s) 214, 216 described with reference to FIG. 2 may include some or all of the components and/or functionality of the client device 1302. The client device 1302 may comprise, for example, a smartphone.

With reference to FIG. 13, the client device 1302 includes a processor 1304, a memory 1306, a user interface 1308, a communication module 1310, and a dataport 1312. These components are communicatively coupled together by an interconnect bus 1314. The processor 1304 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1306 may include both operating memory, such as random-access memory (RAM), as well as data storage, such as read-only memory (ROM), hard drives, flash memory, or any other suitable memory/storage element. The memory 1306 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1304 and the memory 1306 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1304 may be connected to the memory 1306 via the dataport 1312.

The user interface 1308 may include any user interface or presentation elements suitable for a smartphone and/or a portable computing device, such as a keypad, a display screen, a touchscreen, a microphone, and a speaker. The communication module 1310 is configured to handle communication links between the client device 1302 and other, external devices or receivers, and to route incoming/outgoing data appropriately. For example, inbound data from the dataport 1312 may be routed through the communication module 1310 before being directed to the processor 1304, and outbound data from the processor 1304 may be routed through the communication module 1310 before being directed to the dataport 1312. The communication module 1310 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1312 may be any type of connector used for physically interfacing with a smartphone and/or a portable computing device, such as a mini-USB port or an IPHONE®/IPOD® 30-pin connector or LIGHTNING® connector. In other embodiments, the dataport 1312 may include multiple communication channels for simultaneous communication with, for example, other processors, servers, and/or client terminals.

The memory 1306 may store instructions for communicating with other systems, such as a computer. The memory 1306 may store, for example, a program (e.g., computer program code) adapted to direct the processor 1304 in accordance with the present embodiments. The instructions also may include program elements, such as an operating system. While execution of sequences of instructions in the program causes the processor 1304 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 14:
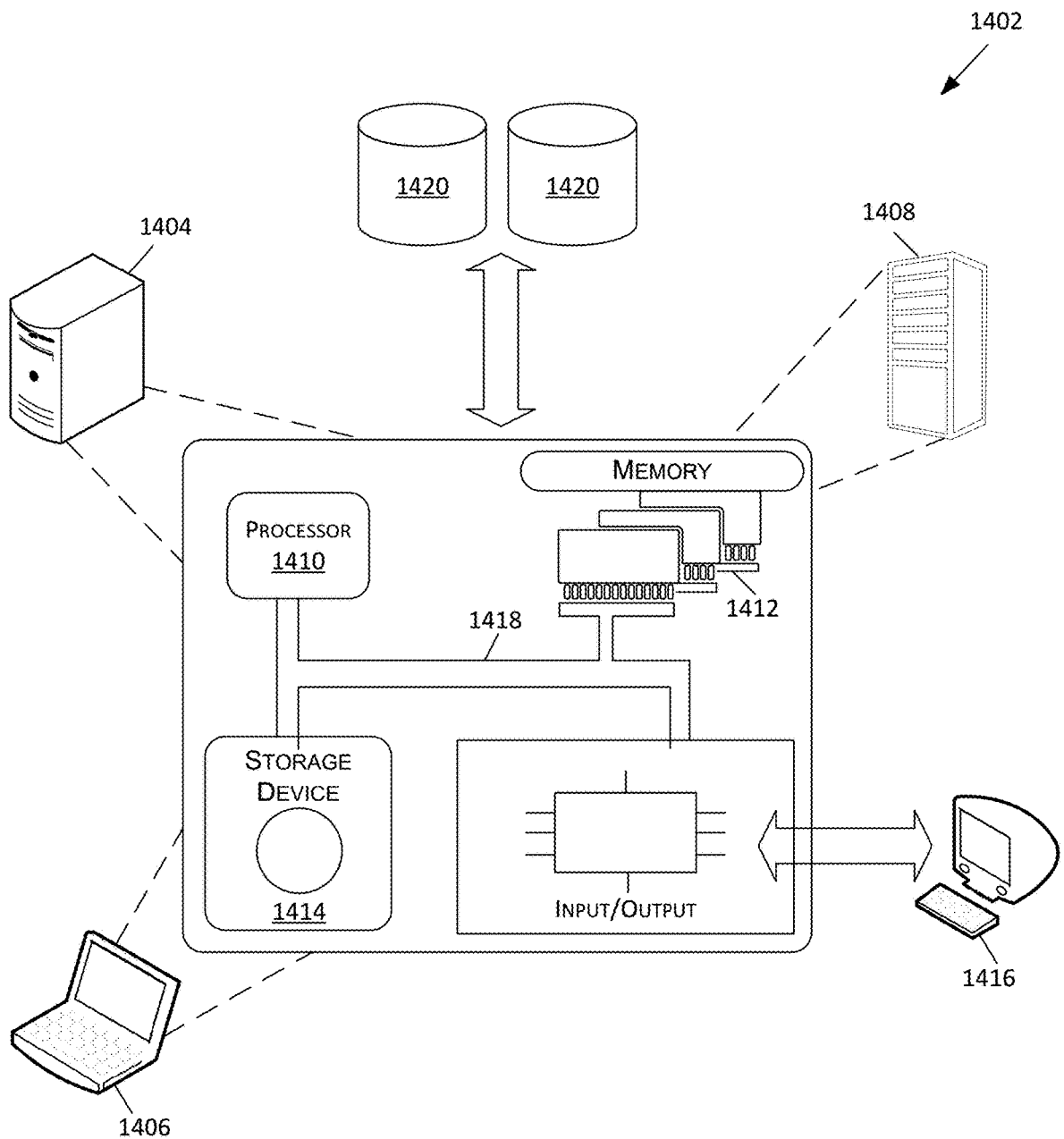
FIG. 14 is a functional block diagram of a general-purpose computing system on which the present embodiments may be implemented according to various aspects of present disclosure.

FIG. 14 is a functional block diagram of a general-purpose computing system on which the present embodiments may be implemented according to various aspects of the present disclosure. The computer system 1402 may be embodied in at least one of a personal computer (also referred to as a desktop computer) 1404, a portable computer (also referred to as a laptop or notebook computer) 1406, and/or a server 1408 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1402 may execute at least some of the operations described above. The computer system 1402 may include at least one processor 1410, memory 1412, at least one storage device 1414, and input/output (I/O) devices 1416. Some or all of the components 1410, 1412, 1414, 1416 may be interconnected via a system bus 1418. The processor 1410 may be single- or multi-threaded and may have one or more cores. The processor 1410 execute instructions, such as those stored in the memory 1412 and/or in the storage device 1414. Information may be received and output using one or more I/O devices 1416.

The memory 1412 may store information, and may be a computer-readable medium, such as volatile or non-volatile memory. The storage device(s) 1414 may provide storage for the system 1402 and, in some embodiments, may be a computer-readable medium. In various aspects, the storage device(s) 1414 may be a flash memory device, a hard disk device, an optical disk device, a tape device, or any other type of storage device.

The I/O devices 1416 may provide input/output operations for the system 1402. The I/O devices 1416 may include a keyboard, a pointing device, and/or a microphone. The I/O devices 1416 may further include a display unit for displaying graphical user interfaces, a speaker, and/or a printer. External data may be stored in one or more accessible external databases 1420.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Various additional embodiments are set forth below. Each embodiment is individually numbered for convenient reference (e.g., a first aspect, a second aspect, etc.). Also, some of the embodiments below, for example, refer to other embodiments and add additional detail.

In a first aspect, a method for locating a source of a sound is provided. The method comprises detecting, at a first A/V recording and communication device, the sound; transmitting, by the first A/V recording and communication device, a first notification in response to detecting the sound; receiving, at a second A/V recording and communication device, the first notification from the first A/V recording and communication device; detecting, at the second A/V recording and communication device, the sound; determining, at the second A/V recording and communication device, based on at least a time of arrival of the first notification at the second A/V recording and communication device and a time of arrival of the sound at the second A/V recording and communication device, a time difference between the time of arrival of the first notification at the second A/V recording and communication device and the time of arrival of the sound at the second A/V recording and communication device; transmitting, by the second A/V recording and communication device, a second notification including the time difference between the time of arrival of the first notification at the second A/V recording and communication device and the time of arrival of the sound at the second A/V recording and communication device; receiving, at a network device, the second notification; and determining a location of the source of the sound based on at least a location of the first A/V recording and communication device, a location of the second A/V recording and communication device, and the time difference between the time of arrival of the first notification at the second A/V recording and communication device and the time of arrival of the sound at the second A/V recording and communication device.

In embodiments of the first aspect, the first A/V recording and communication device comprises a radio, wherein the first notification is transmitted by the radio to the second A/V recording and communication device, and the second A/V recording and communication device detects the sound after receiving the first notification.

In embodiments of the first aspect, including any combination of the embodiments described above, the determined location of the source of the sound is a plane in three-dimensional space.

Embodiments of the first aspect, including any combination of the embodiments described above, further comprise receiving, at a third A/V recording and communication device, the first notification from the first A/V recording and communication device; detecting, at the third A/V recording and communication device, the sound; determining, at the third A/V recording and communication device, based on at least a time of arrival of the first notification at the third A/V recording and communication device and a time of arrival of the sound at the third A/V recording and communication device, a time difference between the time of arrival of the first notification at the third A/V recording and communication device and the time of arrival of the sound at the third A/V recording and communication device; transmitting, by the third A/V recording and communication device, a third notification including the time difference between the time of arrival of the first notification at the third A/V recording and communication device and the time of arrival of the sound at the third A/V recording and communication device; and receiving, at the network device, the third notification; wherein determining the location of the source of the sound is further based on at least a location of the third A/V recording and communication device and the time difference between the time of arrival of the first notification at the third A/V recording and communication device and the time of arrival of the sound at the third A/V recording and communication device.

In embodiments of the first aspect, including any combination of the embodiments described above, the first notification is transmitted by the radio to the third A/V recording and communication device, and the third A/V recording and communication device detects the sound after receiving the first notification.

In embodiments of the first aspect, including any combination of the embodiments described above, the determined location of the source of the sound is a line in three-dimensional space.

Embodiments of the first aspect, including any combination of the embodiments described above, further comprise: receiving, at a fourth A/V recording and communication device, the first notification from the first A/V recording and communication device; detecting, at the fourth A/V recording and communication device, the sound; determining, at the fourth A/V recording and communication device, based on at least a time of arrival of the first notification at the fourth A/V recording and communication device and a time of arrival of the sound at the fourth A/V recording and communication device, a time difference between the time of arrival of the first notification at the fourth A/V recording and communication device and the time of arrival of the sound at the fourth A/V recording and communication device; transmitting, by the fourth A/V recording and communication device, a fourth notification including the time difference between the time of arrival of the first notification at the fourth A/V recording and communication device and the time of arrival of the sound at the fourth A/V recording and communication device; and receiving, at the network device, the fourth notification; wherein determining the location of the source of the sound is further based on at least a location of the fourth A/V recording and communication device and the time difference between the time of arrival of the first notification at the fourth A/V recording and communication device and the time of arrival of the sound at the fourth A/V recording and communication device.

In embodiments of the first aspect, including any combination of the embodiments described above, the first notification is transmitted by the radio to the fourth A/V recording and communication device, and the fourth A/V recording and communication device detects the sound after receiving the first notification.

In embodiments of the first aspect, including any combination of the embodiments described above, the determined location of the source of the sound is a point in three-dimensional space.

Embodiments of the first aspect, including any combination of the embodiments described above, further comprise, after determining the location of the source of the sound: identifying, based on the location of the source of the sound, at least one camera device; and causing the identified at least one camera device to record and transmit at least one of audio data or image data to a computing device.

In embodiments of the first aspect, including any combination of the embodiments described above, the computing device is a backend device; and the identified at least one camera device includes at least one of the first A/V recording and communication device, the second A/V recording and communication device, or a third A/V recording and communication device.

Embodiments of the first aspect, including any combination of the embodiments described above, further comprise, in response to determining the location of the source of the sound, causing the location of the source of the sound to be transmitted to a client device associated with at least the first A/V recording and communication device or the second A/V recording and communication device.

In embodiments of the first aspect, including any combination of the embodiments described above, the source of the sound is a gunshot, an alarm, a person, or a vehicle.

Embodiments of the first aspect, including any combination of the embodiments described above, further comprise, in response to determining the location of the source of the sound, causing the location of the source of the sound to be transmitted to a computing device.

In embodiments of the first aspect, including any combination of the embodiments described above, the sound is a first sound, and the method further comprises: prior to detecting the first sound, causing the source of the sound to generate a second sound; detecting the second sound; and generating, based on the detected second sound, a signature corresponding to the second sound; wherein determining the location of the source of the sound is further based on the signature.

Embodiments of the first aspect, including any combination of the embodiments described above, further comprise storing, by a backend device, the generated signature, wherein the first A/V recording and communication device transmits the first notification to the backend device, and the backend device determines the location of the source of the sound.

Embodiments of the first aspect, including any combination of the embodiments described above, further comprise, prior to detecting the sound at the first A/V recording and communication device, receiving location data from a first client device associated with the first A/V recording and communication device, wherein the first client device is configured to transmit the location data when physically proximate to the source of the sound, and wherein determining the location of the source of the sound is further based on the location data.

In embodiments of the first aspect, including any combination of the embodiments described above, the first client device is further configured to transmit the location data in response to a user input on the first client device.

Embodiments of the first aspect, including any combination of the embodiments described above, further comprise: determining a first location in the interior of a structure, on the exterior of a structure, or at a geographic location outside of a structure; and storing the first location in at least one database; wherein the determined location of the source of the sound corresponds to the first location.

In embodiments of the first aspect, including any combination of the embodiments described above: the sound is detected by a microphone of the first A/V recording and communication device; and the microphone detects the sound after the microphone has transitioned from a passive state to an active state in response to a determination that an amplitude of a prior sound detected by the microphone exceeds a predetermined threshold.

In a second aspect, a system for locating a source of a sound is provided. The system comprises: a first A/V recording and communication device configured to transmit a first notification in response to detecting the sound; a second A/V recording and communication device configured to: receive the first notification from the first A/V recording and communication device; detect the sound; determine, based on at least a time of arrival of the first notification at the second A/V recording and communication device and a time of arrival of the sound at the second A/V recording and communication device, a time difference between the time of arrival of the first notification at the second A/V recording and communication device and the time of arrival of the sound at the second A/V recording and communication device; transmit a second notification including the time difference between the time of arrival of the first notification at the second A/V recording and communication device and the time of arrival of the sound at the second A/V recording and communication device; and a network device configured to receive the second notification and determine a location of the source of the sound based on at least the time difference between the time of arrival of the first notification at the second A/V recording and communication device and the time of arrival of the sound at the second A/V recording and communication device.

In embodiments of the second aspect, the first A/V recording and communication device detects the sound using a microphone.

In embodiments of the second aspect, including any combination of the embodiments described above, determining the location of the source of the sound is further based on at least one of a location of the first A/V recording and communication device, or a location of the second A/V recording and communication device.

In embodiments of the second aspect, including any combination of the embodiments described above, the first A/V recording and communication device comprises a radio configured to transmit the first notification to the second A/V recording and communication device, and the second A/V recording and communication device is further configured to detect the sound after receiving the first notification.

In embodiments of the second aspect, including any combination of the embodiments described above, the determined location of the source of the sound is a plane in three-dimensional space.

Embodiments of the second aspect, including any combination of the embodiments described above, further comprise a third A/V recording and communication device configured to: receive the first notification from the first A/V recording and communication device; detect the sound; determine, based on at least a time of arrival of the first notification at the third A/V recording and communication device and a time of arrival of the sound at the third A/V recording and communication device, a time difference between the time of arrival of the first notification at the third A/V recording and communication device and the time of arrival of the sound at the third A/V recording and communication device; and transmit a third notification including the time difference between the time of arrival of the first notification at the third A/V recording and communication device and the time of arrival of the sound at the third A/V recording and communication device; wherein the network device is further configured to receive the third notification; and wherein determining the location of the source of the sound is further based on at least a location of the third A/V recording and communication device and the time difference between the time of arrival of the first notification at the third A/V recording and communication device and the time of arrival of the sound at the third A/V recording and communication device.

In embodiments of the second aspect, including any combination of the embodiments described above, the third A/V recording and communication device is further configured to detect the sound after receiving the first notification.

In embodiments of the second aspect, including any combination of the embodiments described above, the determined location of the source of the sound is a line in three-dimensional space.

Embodiments of the second aspect, including any combination of the embodiments described above, further comprise a fourth A/V recording and communication device configured to: receive the first notification from the first A/V recording and communication device; detect the sound; determine, based on at least a time of arrival of the first notification at the fourth A/V recording and communication device and a time of arrival of the sound at the fourth A/V recording and communication device, a time difference between the time of arrival of the first notification at the fourth A/V recording and communication device and the time of arrival of the sound at the fourth A/V recording and communication device; and transmit a fourth notification including the time difference between the time of arrival of the first notification at the fourth A/V recording and communication device and the time of arrival of the sound at the fourth A/V recording and communication device; wherein the network device is further configured to receive the fourth notification; and wherein determining the location of the source of the sound is further based on at least a location of the fourth A/V recording and communication device and the time difference between the time of arrival of the first notification at the fourth A/V recording and communication device and the time of arrival of the sound at the fourth A/V recording and communication device.

In embodiments of the second aspect, including any combination of the embodiments described above, the first A/V recording and communication device comprises a radio configured to transmit the first notification to the fourth A/V recording and communication device, and the fourth A/V recording and communication device is further configured to detect the sound after receiving the first notification.

In embodiments of the second aspect, including any combination of the embodiments described above, the determined location of the source of the sound is a point in three-dimensional space.

In embodiments of the second aspect, including any combination of the embodiments described above, the network device is further configured to, after determining the location of the source of the sound: identify at least one camera device; and cause the identified at least one camera device to record and transmit at least one of audio data or image data to a computing device.

In embodiments of the second aspect, including any combination of the embodiments described above, the computing device is a backend device; and the identified at least one camera device includes at least one of the first A/V recording and communication device, the second A/V recording and communication device, or a third A/V recording and communication device.

In embodiments of the second aspect, including any combination of the embodiments described above, the network device is further configured to, in response to determining the location of the source of the sound, cause the location of the source of the sound to be transmitted to a client device associated with at least the first A/V recording and communication device or the second A/V recording and communication device.

In embodiments of the second aspect, including any combination of the embodiments described above, the source of the sound is a gunshot, an alarm, a person, or a vehicle.

In embodiments of the second aspect, including any combination of the embodiments described above, the network device is further configured to, in response to determining the location of the source of the sound, cause the location of the source of the sound to be transmitted to a computing device.

In embodiments of the second aspect, including any combination of the embodiments described above, the network device is further configured to generate a signature corresponding to a prior sound generated by the source; and determining the location of the source of the sound is further based on the signature.

In embodiments of the second aspect, including any combination of the embodiments described above, the network device is further configured to store the generated signature; and the first A/V recording and communication device is further configured to transmit the first notification to the network device.

Embodiments of the second aspect, including any combination of the embodiments described above, further comprise a first client device associated with the first A/V recording and communication device, wherein: the first client device is configured to transmit location data when physically proximate to the source of the sound; and the network device is further configured to receive the location data from the first client device, and determine the location of the source of the sound further based on the location data.

In embodiments of the second aspect, including any combination of the embodiments described above, the first client device is further configured to transmit the location data in response to a user input on the first client device.

In embodiments of the second aspect, including any combination of the embodiments described above, the network device is further configured to: receive a first location in the interior of a structure, on the exterior of a structure, or at a geographic location outside of a structure; and store the first location in at least one database; wherein the determined location of the source of the sound corresponds to the first location.

In embodiments of the second aspect, including any combination of the embodiments described above, the first A/V recording and communication device comprises a microphone, and the first A/V recording and communication device is further configured to detect the sound after the microphone has transitioned from a passive state to an active state in response to a determination that an amplitude of a prior sound detected by the microphone exceeds a predetermined threshold.

In a third aspect, a method for locating a source of a sound is provided. The method comprises: receiving a first notification from a first computing device, wherein the first notification is transmitted by the first computing device in response to detecting the sound; receiving a second notification from a second computing device, wherein the second notification is transmitted by the second computing device in response to detecting the sound; and determining a location of the source of the sound based on at least a time difference between a time of arrival of the first notification at the second computing device and a time of detecting the sound at the second computing device.

In embodiments of the third aspect, the time of arrival of the first notification at the second computing device and the time of detecting the sound at the second computing device are each determined based on a network time protocol.

In embodiments of the third aspect, including any combination of the embodiments described above, the second notification includes the time difference.

In embodiments of the third aspect, including any combination of the embodiments described above, the second notification includes the time of arrival of the first notification at the second computing device and the time of detecting the sound at the second computing device.

In embodiments of the third aspect, including any combination of the embodiments described above, the first notification includes a time of detecting the sound at the first computing device.

In embodiments of the third aspect, including any combination of the embodiments described above, determining the location of the source of the sound is further based on a location of the first computing device and a location of the second computing device.

In embodiments of the third aspect, including any combination of the embodiments described above, the second computing device is configured to determine the time difference.

In embodiments of the third aspect, including any combination of the embodiments described above, the first computing device comprises a radio, and the first notification is transmitted by the radio to the second computing device.

In embodiments of the third aspect, including any combination of the embodiments described above, the determined location of the source of the sound is a plane in three-dimensional space.

Embodiments of the third aspect, including any combination of the embodiments described above, further comprise: receiving a third notification from a third computing device, the third notification including a time difference between a time of arrival of the first notification at the third computing device and a time of detecting the sound at the third computing device; wherein determining the location of the source of the sound is further based on at least a location of the third computing device and the time difference between the time of arrival of the first notification at the third computing device and the time of detecting the sound at the third computing device.

In embodiments of the third aspect, including any combination of the embodiments described above, the determined location of the source of the sound is a line in three-dimensional space.

Embodiments of the third aspect, including any combination of the embodiments described above, further comprise: receiving a fourth notification from a fourth computing device, the fourth notification including a time difference between a time of arrival of the first notification at the fourth computing device and a time of detecting the sound at the fourth computing device; wherein determining the location of the source of the sound is further based on at least a location of the fourth computing device and the time difference between the time of arrival of the first notification at the fourth computing device and the time of detecting the sound at the fourth computing device.

In embodiments of the third aspect, including any combination of the embodiments described above, the determined location of the source of the sound is a point in three-dimensional space.

Embodiments of the third aspect, including any combination of the embodiments described above, further comprise, after determining the location of the source of the sound, causing at least one camera device to record and transmit at least one of audio data or image data.

In embodiments of the third aspect, including any combination of the embodiments described above, the at least one camera device includes the first computing device.

Embodiments of the third aspect, including any combination of the embodiments described above, further comprise, in response to determining the location of the source of the sound, causing the location of the source of the sound to be transmitted to a client device associated with the second computing device.

In embodiments of the third aspect, including any combination of the embodiments described above, the source of the sound is a gunshot.

Embodiments of the third aspect, including any combination of the embodiments described above, further comprise, in response to determining the location of the source of the sound, causing the location of the source of the sound to be transmitted to a third computing device.

In embodiments of the third aspect, including any combination of the embodiments described above, the sound is a first sound, and the method further comprises: causing the source of the sound to generate a second sound; and generating a signature corresponding to the second sound; wherein determining the location of the source of the sound is further based on the signature.

In embodiments of the third aspect, including any combination of the embodiments described above, the first computing device transmits the first notification to a backend device, and the backend device determines the location of the source of the sound.

In embodiments of the third aspect, including any combination of the embodiments described above, determining the location of the source of the sound is further based on location data received from a first client device prior to detecting the sound at the second computing device; and the first client device is configured to transmit the location data when physically proximate to the source of the sound.

In embodiments of the third aspect, including any combination of the embodiments described above, the first client device is further configured to transmit the location data in response to an input at a user interface of the first client device.

Embodiments of the third aspect, including any combination of the embodiments described above, further comprise: determining a first location in the interior of a structure, on the exterior of a structure, or at a geographic location outside of a structure; wherein the determined location of the source of the sound corresponds to the first location.

In embodiments of the third aspect, including any combination of the embodiments described above, the sound is detected at the second computing device by a microphone after the second computing device transitions from a passive state to an active state.

In embodiments of the third aspect, including any combination of the embodiments described above, at least one of the first computing device and the second computing device is an A/V recording and communication device.

What is claimed is:

1. A method for locating a source of a sound, the method comprising:
    detecting, at a first A/V recording and communication device, the sound;
    transmitting, by the first A/V recording and communication device, a first notification in response to detecting the sound;
    receiving, at a second A/V recording and communication device, the first notification from the first A/V recording and communication device;
    detecting, at the second A/V recording and communication device, the sound;
    determining, at the second A/V recording and communication device, based on at least a time of arrival of the first notification at the second A/V recording and communication device and a time of arrival of the sound at the second A/V recording and communication device, a time difference between the time of arrival of the first notification at the second A/V recording and communication device and the time of arrival of the sound at the second A/V recording and communication device;
    transmitting, by the second A/V recording and communication device, a second notification including the time difference between the time of arrival of the first notification at the second A/V recording and communication device and the time of arrival of the sound at the second A/V recording and communication device;
    receiving, at a network device, the second notification; and
    determining a location of the source of the sound based on at least a location of the first A/V recording and communication device, a location of the second A/V recording and communication device, and the time difference between the time of arrival of the first notification at the second A/V recording and communication device and the time of arrival of the sound at the second A/V recording and communication device.

2. The method of claim 1, wherein the first A/V recording and communication device comprises a radio, the first notification is transmitted by the radio to the second A/V recording and communication device, and the second A/V recording and communication device detects the sound after receiving the first notification.

3. The method of claim 1, further comprising, after determining the location of the source of the sound:
    identifying, based on the location of the source of the sound, at least one camera device; and
    causing the identified at least one camera device to record and transmit at least one of audio data or image data to a computing device.

4. The method of claim 1, further comprising, in response to determining the location of the source of the sound, causing the location of the source of the sound to be transmitted to a client device associated with at least the first A/V recording and communication device or the second A/V recording and communication device.

5. The method of claim 1, wherein the sound is a first sound, the method further comprising:
    prior to detecting the first sound, causing the source of the sound to generate a second sound;
    detecting the second sound; and
    generating, based on the detected second sound, a signature corresponding to the second sound;
    wherein determining the location of the source of the sound is further based on the signature.

6. The method of claim 1, further comprising, prior to detecting the sound at the first A/V recording and communication device, receiving location data from a client device associated with the first A/V recording and communication device, wherein the client device is configured to transmit the location data when physically proximate to the source of the sound, and wherein determining the location of the source of the sound is further based on the location data.

7. The method of claim 1, further comprising:
    determining a first location in the interior of a structure, on the exterior of a structure, or at a geographic location outside of a structure; and
    storing the first location in at least one database;
    wherein the determined location of the source of the sound corresponds to the first location.

8. The method of claim 1, wherein:
    the sound is detected by a microphone of the first A/V recording and communication device; and
    the microphone detects the sound after the microphone has transitioned from a passive state to an active state in response to a determination that an amplitude of a prior sound detected by the microphone exceeds a predetermined threshold.

9. A system for locating a source of a sound, the system comprising:
    a first A/V recording and communication device configured to transmit a first notification in response to detecting the sound;
    a second A/V recording and communication device configured to:
        receive the first notification from the first A/V recording and communication device;
        detect the sound;
        determine, based on at least a time of arrival of the first notification at the second A/V recording and communication device and a time of arrival of the sound at the second A/V recording and communication device, a time difference between the time of arrival of the first notification at the second A/V recording and communication device and the time of arrival of the sound at the second A/V recording and communication device;
        transmit a second notification including the time difference between the time of arrival of the first notification at the second A/V recording and communication device and the time of arrival of the sound at the second A/V recording and communication device; and a network device configured to receive the second notification and determine a location of the source of the sound based on at least the time difference between the time of arrival of the first notification at the second A/V recording and communication device and the time of arrival of the sound at the second A/V recording and communication device.

10. The system of claim 9, wherein the first A/V recording and communication device comprises a radio configured to transmit the first notification to the second A/V recording and communication device, and the second A/V recording and communication device is further configured to detect the sound after receiving the first notification.

11. A method for locating a source of a sound, the method comprising:

receiving a first notification from a first computing device, wherein the first notification is transmitted by the first computing device in response to detecting the sound;

receiving a second notification from a second computing device that also received the first notification, wherein the second notification is transmitted by the second computing device in response to detecting the sound; and determining a location of the source of the sound based on at least a time difference between a time of arrival of the first notification at the second computing device and a time of detecting the sound at the second computing device.

12. The method of claim 11, wherein the time of arrival of the first notification at the second computing device and the time of detecting the sound at the second computing device are each determined based on a network time protocol.

13. The method of claim 11, wherein the second notification includes the time difference.

14. The method of claim 11, wherein the second notification includes the time of arrival of the first notification at the second computing device and the time of detecting the sound at the second computing device.

15. The method of claim 11, wherein the first notification includes a time of detecting the sound at the first computing device.

16. The method of claim 11, wherein determining the location of the source of the sound is further based on a location of the first computing device and a location of the second computing device.

17. The method of claim 11, wherein the second computing device is configured to determine the time difference.

18. The method of claim 11, wherein the first computing device comprises a radio, and the first notification is transmitted by the radio to the second computing device.

19. The method of claim 11, further comprising:

receiving a third notification from a third computing device that also received the first notification, the third notification including a time difference between a time of arrival of the first notification at the third computing device and a time of detecting the sound at the third computing device;

wherein determining the location of the source of the sound is further based on at least a location of the third computing device and the time difference between the time of arrival of the first notification at the third computing device and the time of detecting the sound at the third computing device.

20. The method of claim 11, further comprising, after determining the location of the source of the sound, causing at least one camera device to record and transmit at least one of audio data or image data.

21. The method of claim 11, further comprising, in response to determining the location of the source of the sound, causing the location of the source of the sound to be transmitted to a client device associated with the second computing device.

22. The method of claim 11, further comprising, in response to determining the location of the source of the sound, causing the location of the source of the sound to be transmitted to a third computing device.

23. The method of claim 11, wherein the sound is a first sound, the method further comprising:

causing the source of the sound to generate a second sound; and generating a signature corresponding to the second sound;

wherein determining the location of the source of the sound is further based on the signature.

24. The method of claim 11, wherein:

determining the location of the source of the sound is further based on location data received from a client device prior to detecting the sound at the second computing device; and the client device is configured to transmit the location data when physically proximate to the source of the sound.

25. The method of claim 11, further comprising:

determining a first location in the interior of a structure, on the exterior of a structure, or at a geographic location outside of a structure;

wherein the determined location of the source of the sound corresponds to the first location.

26. The method of claim 11, wherein the sound is detected at the second computing device by a microphone after the second computing device transitions from a passive state to an active state.

27. The method of claim 11, wherein at least one of the first computing device and the second computing device is an A/V recording and communication device.

* * * * *